(12) United States Patent
Walley et al.

(10) Patent No.: US 7,885,314 B1
(45) Date of Patent: Feb. 8, 2011

(54) CANCELLATION SYSTEM AND METHOD FOR A WIRELESS POSITIONING SYSTEM

(76) Inventors: Kenneth Scott Walley, 19262 Shadow Oak Dr., Portola Hills, CA (US) 92679-1042; Paul A. Underbrink, 25212 Calle Del Lago, Lake Forest, CA (US) 92630-2150; Steven A. Gronemeyer, 6908 Wilton Dr., NE., Cedar Rapids, IA (US) 52402

( * ) Notice: Subject to any disclaimer, the term of this patent is extended or adjusted under 35 U.S.C. 154(b) by 0 days.

(21) Appl. No.: 09/562,749

(22) Filed: May 2, 2000

(51) Int. Cl.
   *H04B 1/00* (2006.01)
(52) U.S. Cl. .............. 375/144; 375/136; 375/143; 375/148; 375/152; 375/346; 375/350
(58) Field of Classification Search ......... 375/130–152, 375/346–350; 370/342, 441
   See application file for complete search history.

(56) References Cited

U.S. PATENT DOCUMENTS

| | | | |
|---|---|---|---|
| 3,604,911 A | 9/1971 | Schmitt | 235/181 |
| 3,975,628 A | 8/1976 | Graves et al. | 250/199 |
| 4,426,712 A | 1/1984 | Gorski-Popiel | 375/96 |
| 4,445,118 A | 4/1984 | Taylor et al. | 343/357 |
| 4,463,357 A | 7/1984 | MacDoran | 343/460 |
| 4,578,678 A | 3/1986 | Hurd | 343/357 |
| 4,667,203 A | 5/1987 | Counselman, III | 342/357 |
| 4,701,934 A | 10/1987 | Jasper | 375/1 |
| 4,754,465 A | 6/1988 | Trimble | 375/1 |
| 4,785,463 A | 11/1988 | Janc et al. | 375/1 |
| 4,809,005 A | 2/1989 | Counselman, III | 342/352 |
| 4,821,294 A | 4/1989 | Thomas, Jr. | 375/96 |
| 4,890,233 A | 12/1989 | Ando et al. | 364/457 |
| 4,894,662 A | 1/1990 | Counselman | 342/357 |
| 4,894,842 A | 1/1990 | Broekhoven et al. | 375/1 |
| 4,992,720 A | 2/1991 | Hata | 320/23 |
| 4,998,111 A | 3/1991 | Ma et al. | 342/352 |
| 5,014,066 A | 5/1991 | Counselman, III | 342/352 |

(Continued)

FOREIGN PATENT DOCUMENTS

EP   0639901 A2   8/1994

(Continued)

OTHER PUBLICATIONS

D. J. R. Van Nee and A. J. R. M. Coenen, "New Fast GPS Code-Acquistion Technique Using FFT," Jan. 17,1991, *Electronics Letters*, vol. 27, No. 2.

*Primary Examiner*—Curtis B Odom
(74) *Attorney, Agent, or Firm*—Duane Morris LLP

(57) ABSTRACT

A cancellation system that delays received Global Positioning System ("GPS") signals and cancels less than all of the received GPS signals from the delayed version of the received GPS signals. A delay circuit produces a delayed version of the received GPS signals and a demodulator and despreader unit produces a demodulated and despread GPS signal corresponding to one of the received GPS signals. A respreader and remodulator unit produces a remodulated and respread GPS signal from the demodulated and despread GPS signal and a combiner produces a combined GPS signal from the delayed version of the received GPS signals and the remodulated and respread GPS signal. The cancellation system and method may also store the received GPS signals and cancel less than all the received GPS signals from the stored version of the received GPS signals.

42 Claims, 11 Drawing Sheets

U.S. PATENT DOCUMENTS

| | | | | |
|---|---|---|---|---|
| 5,018,088 A | | 5/1991 | Higbie | 364/574 |
| 5,036,329 A | | 7/1991 | Ando | 342/357 |
| 5,043,736 A | | 8/1991 | Darnell et al. | 342/357 |
| 5,101,416 A | * | 3/1992 | Fenton et al. | 375/150 |
| 5,108,334 A | | 4/1992 | Eschenbach et al. | 455/314 |
| 5,148,042 A | | 9/1992 | Nakazoe | 307/65 |
| 5,153,591 A | | 10/1992 | Clark | 341/51 |
| 5,179,724 A | | 1/1993 | Lindoff | 455/76 |
| 5,202,829 A | | 4/1993 | Geier | 364/449 |
| 5,225,842 A | | 7/1993 | Brown et al. | 342/357 |
| 5,253,268 A | | 10/1993 | Omura et al. | 375/1 |
| 5,276,765 A | | 1/1994 | Fremman et al. | 395/2 |
| 5,293,170 A | | 3/1994 | Lorenz et al. | 376/309 |
| 5,293,398 A | | 3/1994 | Hamao et al. | 375/1 |
| 5,297,097 A | | 3/1994 | Etoh et al. | 365/226 |
| 5,311,195 A | | 5/1994 | Mathis et al. | 342/357 |
| 5,323,164 A | | 6/1994 | Endo | 342/357 |
| 5,343,209 A | | 8/1994 | Sennott et al. | 342/357 |
| 5,345,244 A | | 9/1994 | Gildea et al. | 342/357 |
| 5,347,536 A | | 9/1994 | Meehan | 375/1 |
| 5,352,970 A | | 10/1994 | Armstrong, II | 320/39 |
| 5,363,030 A | | 11/1994 | Ford et al. | 320/13 |
| 5,378,155 A | | 1/1995 | Eldridge | 434/11 |
| 5,379,224 A | | 1/1995 | Brown et al. | 364/449 |
| 5,381,447 A | * | 1/1995 | Ayerst et al. | 375/147 |
| 5,396,515 A | | 3/1995 | Dixon et al. | 375/208 |
| 5,402,346 A | | 3/1995 | Lion et al. | 364/449 |
| 5,402,347 A | | 3/1995 | McBurney et al. | 364/443 |
| 5,410,747 A | | 4/1995 | Ohmagari et al. | 455/118 |
| 5,416,712 A | | 5/1995 | Geier et al. | 364/450 |
| 5,418,818 A | | 5/1995 | Marchetto et al. | 375/264 |
| 5,420,593 A | | 5/1995 | Niles | 342/357 |
| 5,440,313 A | | 8/1995 | Osterdock et al. | 342/352 |
| 5,450,344 A | | 9/1995 | Woo et al. | 364/449 |
| 5,498,239 A | | 3/1996 | Galel et al. | 604/95 |
| 5,504,684 A | | 4/1996 | Lau et al. | 364/443 |
| 5,546,445 A | | 8/1996 | Dennison et al. | 379/60 |
| 5,548,613 A | | 8/1996 | Kahu et al. | 375/208 |
| 5,550,811 A | | 8/1996 | Kahu et al. | 370/18 |
| 5,568,473 A | | 10/1996 | Hemmati | 370/18 |
| 5,577,023 A | | 11/1996 | Marum et al. | 370/16 |
| 5,577,025 A | | 11/1996 | Skinner et al. | 370/22 |
| 5,592,173 A | | 1/1997 | Lau et al. | 342/357 |
| 5,594,453 A | | 1/1997 | Rodal et al. | 342/357 |
| 5,608,722 A | | 3/1997 | Miller | 370/320 |
| 5,623,485 A | | 4/1997 | Bi | 370/209 |
| 5,625,668 A | | 4/1997 | Loomis et al. | 379/58 |
| 5,640,429 A | | 6/1997 | Michaels et al. | 375/340 |
| 5,640,431 A | | 6/1997 | Bruckert et al. | 375/344 |
| 5,642,377 A | | 6/1997 | Chung et al. | 375/200 |
| 5,644,591 A | | 7/1997 | Sutton | 375/200 |
| 5,644,592 A | * | 7/1997 | Divsalar et al. | 375/147 |
| 5,649,000 A | | 7/1997 | Lee et al. | 455/436 |
| 5,650,792 A | | 7/1997 | Moore et al. | 343/725 |
| 5,654,718 A | | 8/1997 | Beason et al. | 342/357 |
| 5,663,734 A | | 9/1997 | Krasner | 342/357 |
| 5,663,735 A | | 9/1997 | Eshenbach | 342/357 |
| 5,689,814 A | | 11/1997 | Hagisawa et al. | 455/69 |
| 5,722,061 A | | 2/1998 | Hutchison, IV et al. | 455/245.1 |
| 5,734,674 A | | 3/1998 | Fenton et al. | 375/207 |
| 5,734,966 A | | 3/1998 | Farrer et al. | 455/63 |
| 5,737,329 A | | 4/1998 | Horiguchi | 370/342 |
| 5,739,596 A | | 4/1998 | Takizawa et al. | 307/66 |
| 5,749,067 A | | 5/1998 | Barrett | 704/233 |
| 5,781,156 A | | 7/1998 | Krasner | 342/357 |
| 5,784,695 A | | 7/1998 | Upton et al. | 455/442 |
| 5,786,789 A | | 7/1998 | Janky | 342/357 |
| 5,790,537 A | * | 8/1998 | Yoon et al. | 370/342 |
| 5,812,087 A | | 9/1998 | Krasner | 342/357 |
| 5,825,327 A | | 10/1998 | Krasner | 342/357 |
| 5,828,694 A | | 10/1998 | Schipper | 375/208 |
| 5,831,574 A | | 11/1998 | Krasner | 342/357 |
| 5,832,021 A | | 11/1998 | Kondo | 375/200 |
| 5,841,396 A | | 11/1998 | Krasner | 342/357 |
| 5,845,203 A | | 12/1998 | LaDue | 455/414 |
| 5,852,630 A | * | 12/1998 | Langberg et al. | 375/219 |
| 5,854,605 A | | 12/1998 | Gildea | 342/357 |
| 5,862,465 A | | 1/1999 | Ou | 455/234.1 |
| 5,867,535 A | | 2/1999 | Phillips et al. | 375/295 |
| 5,867,795 A | | 2/1999 | Novis et al. | 455/566 |
| 5,872,540 A | | 2/1999 | Casabona et al. | 342/362 |
| 5,874,914 A | | 2/1999 | Krasner | 342/357 |
| 5,877,724 A | | 3/1999 | Davis | 342/357 |
| 5,877,725 A | | 3/1999 | Kalafus | 342/357 |
| 5,881,371 A | | 3/1999 | Reynolds | 455/83 |
| 5,883,594 A | | 3/1999 | Lau | 342/357 |
| 5,884,214 A | | 3/1999 | Krasner | 701/207 |
| 5,889,474 A | | 3/1999 | LaDue | 340/825.49 |
| 5,903,654 A | | 5/1999 | Milton et al. | 380/49 |
| 5,907,809 A | | 5/1999 | Molnar et al. | 455/456 |
| 5,909,640 A | | 6/1999 | Farrer et al. | 455/63 |
| 5,917,444 A | | 6/1999 | Loomis et al. | 342/357 |
| 5,917,829 A | | 6/1999 | Hertz et al. | 370/479 |
| 5,920,283 A | | 7/1999 | Shaheen et al. | 342/357 |
| 5,923,703 A | | 7/1999 | Pon et al. | 375/209 |
| 5,924,024 A | | 7/1999 | Ikeda et al. | 455/313 |
| 5,926,131 A | | 7/1999 | Sakumoto et al. | 342/357 |
| 5,936,572 A | | 8/1999 | Loomis et al. | 342/357 |
| 5,943,363 A | | 8/1999 | Hanson et al. | 375/206 |
| 5,945,944 A | | 8/1999 | Krasner | 342/357.06 |
| 5,956,328 A | | 9/1999 | Sato | 370/335 |
| 5,963,582 A | | 10/1999 | Stansell, Jr. | 375/200 |
| 5,970,084 A | | 10/1999 | Honda | 375/200 |
| 5,974,039 A | * | 10/1999 | Schilling | 370/335 |
| 5,977,909 A | | 11/1999 | Harrison et al. | 342/357.09 |
| 5,982,324 A | | 11/1999 | Watters et al. | 342/357.06 |
| 5,987,016 A | | 11/1999 | He | 370/335 |
| 5,991,309 A | | 11/1999 | Jensen et al. | 370/492 |
| 5,991,613 A | | 11/1999 | Euscher et al. | 455/277.1 |
| 5,995,537 A | | 11/1999 | Kondo | 375/208 |
| 5,999,124 A | | 12/1999 | Sheynblat | 342/357.09 |
| 6,002,362 A | | 12/1999 | Gudat | 342/357.03 |
| 6,002,363 A | | 12/1999 | Krasner | 342/357.1 |
| 6,002,709 A | | 12/1999 | Hendrickson | 375/206 |
| 6,009,551 A | | 12/1999 | Sheynblat | 714/776 |
| 6,016,119 A | | 1/2000 | Krasner | 342/357.06 |
| 6,023,462 A | | 2/2000 | Nieczyporowicz et al. | 370/335 |
| 6,041,222 A | | 3/2000 | Horton et al. | 455/255 |
| 6,044,105 A | * | 3/2000 | Gronemeyer | 375/152 |
| 6,047,016 A | | 4/2000 | Ramberg et al. | 375/200 |
| 6,047,017 A | | 4/2000 | Cahn et al. | 375/200 |
| 6,049,715 A | | 4/2000 | Willhoff et al. | 455/436 |
| 6,052,081 A | | 4/2000 | Krasner | 342/357.02 |
| 6,061,018 A | | 5/2000 | Sheynblat | 342/357.06 |
| 6,064,336 A | | 5/2000 | Krasner | 342/357.05 |
| 6,064,688 A | | 5/2000 | Yanagi | 375/149 |
| 6,075,809 A | | 6/2000 | Naruse | 375/147 |
| 6,075,810 A | * | 6/2000 | Raghavan et al. | 375/130 |
| 6,075,987 A | * | 6/2000 | Camp et al. | 455/427 |
| 6,104,338 A | | 8/2000 | Krasner | 342/357.06 |
| 6,104,340 A | | 8/2000 | Krasner | 342/357.1 |
| 6,107,960 A | | 8/2000 | Krasner | 342/357.09 |
| 6,111,540 A | | 8/2000 | Krasner | 342/357.1 |
| 6,131,067 A | | 10/2000 | Girerd et al. | 701/213 |
| 6,133,871 A | | 10/2000 | Krasner | 342/357.06 |
| 6,133,873 A | | 10/2000 | Krasner | 342/357.12 |
| 6,133,874 A | | 10/2000 | Krasner | 342/357.15 |
| 6,150,980 A | | 11/2000 | Krasner | 342/357.1 |
| 6,236,354 B1 | * | 5/2001 | Krasner | 342/357.06 |
| 6,240,099 B1 | * | 5/2001 | Lim et al. | 370/441 |

| | | | | | |
|---|---|---|---|---|---|
| 6,473,451 B1 * | 10/2002 | Seki et al. ................... 375/142 | JP | 08/065205 A | 8/1996 |
| | | | WO | WO 92/13392 | 8/1992 |
| FOREIGN PATENT DOCUMENTS | | | WO | WO 00/19644 | 4/2000 |
| EP | 0639901 A3 | 8/1994 | * cited by examiner | | |

CANCELLATION SYSTEM AND METHOD FOR A WIRELESS POSITIONING SYSTEM

TECHNICAL FIELD

This invention relates generally to the field of wireless communications. In particular, the invention relates to a system and method for canceling received signals at the receiver of a wireless device.

BACKGROUND OF THE INVENTION

The worldwide use of wireless devices such as cellular telephones is growing at a rapid pace. As the number of people using wireless devices increases, the number of features offered by wireless service providers increasingly matches the features offered by traditional land-line telephone service providers. Features such as call waiting, call forwarding, caller identification (caller I.D.), three-way calling, and others are commonly offered by both land-line and wireless service providers. These features operate in the same manner on both wireless devices and land-line telephones. Enhanced 911 (also known as E911) services, however, operate differently on land-line telephones (normally referred to as a "911" call) than on wireless devices.

When a 911 call is placed from a land-line telephone, the 911 reception center receives the call and determines the origin of the call. In case the caller fails, or forgets, to identify his or her location, the 911 reception center is able to obtain the location from which the call was made from the land-line telephone switching network and send emergency personnel to the location of the call.

If instead, an E911 call is placed from a wireless device such as a cellular telephone, the E911 reception center receives the call but cannot determine the origin of the call. If the caller fails, or forgets, to identify his or her location, the E911 reception center is unable to obtain the location of the call because the mobile switching network is different than the land-line telephone switching network. At present, the best that the E911 reception center may possibly do is determine the location of the base station corresponding to the cell from which the call was placed. Unfortunately, typical cells in a cellular system may cover an area with approximately a 30 mile diameter.

A proposed solution to this problem is to use a wireless positioning system that includes satellites and/or pseudolites (base stations) to triangulate the position of a wireless device. The Global Positioning System "GPS," also known as NAVSTAR, is an example of a satellite based navigation system that may be used by a wireless device in combination with an appropriate GPS receiver to pinpoint its location on earth. The array of GPS satellites transmits highly accurate, time coded information that permits a receiver to calculate its exact location in terms of latitude and longitude on earth as well as the altitude above sea level. The GPS system is designed to provide a base navigation system with accuracy to within 100 meters for non-military use and greater precision for the military.

The space segment of the GPS system is a constellation of satellites orbiting above the earth that contain transmitters, which send highly accurate timing information to GPS receivers on earth. The fully implemented GPS system consists of 21 main operational satellites plus three active spare satellites. These satellites are arranged in six orbits, each orbit containing three or four satellites. The orbital planes form a 55° angle with the equator. The satellites orbit at a height of 10,898 nautical miles (20,200 kilometers) above earth with orbital periods for each satellite of approximately 12 hours.

Each of the orbiting satellites contains four highly accurate atomic clocks. These provide precision timing pulses used to generate a unique binary code (also known as a pseudo random or pseudo noise (PN) code) that is transmitted to earth. The PN code identifies the specific satellite in the constellation. The satellite also transmits a set of digitally coded ephemeris data that completely defines the precise orbit of the satellite. The ephemeris data indicates where the satellite is at any given time, and its location may be specified in terms of the satellite ground track in precise latitude and longitude measurements. The information in the ephemeris data is coded and transmitted from the satellite providing an accurate indication of the exact position of the satellite above the earth at any given time. A ground control station updates the ephemeris data of the satellite once per day to ensure accuracy.

A GPS receiver configured in a wireless device is designed to pick up signals from three, four, or more satellites simultaneously. The GPS receiver decodes the information and, using the time and ephemeris data, calculates the approximate position of the wireless device. The GPS receiver contains a floating-point processor that performs the necessary calculations and may output a decimal display of latitude and longitude as well as altitude on the handset. Readings from three satellites are necessary for latitude and longitude information. A fourth satellite reading is required in order to compute altitude.

Unfortunately, a problem to this solution is that, oftentimes, one or more of the signal sources (from either the satellites and/or pseudolites) will interfere with other signal sources, due to individual signal strength. In a sense, one signal will overwhelm, or jam, other signals, so that computation of the position of the wireless device is not possible. Therefore, there is a need for a cancellation system that cancels the strongest signals until a suitable configuration of signal sources may be detected for computing the position of the wireless device.

SUMMARY

A number of technical advances are achieved in the art by implementing a cancellation system in a spread spectrum environment. The cancellation system may be broadly conceptualized as a system for allowing weaker received signals from the cancellation system to be detected from other stronger received signals that may potentially overwhelm the weaker received signals.

For example, a cancellation system may utilize a system architecture that delays the received signals and cancels less than all the received signals from the delayed version of the received signals. An implementation of this system architecture may include a delay circuit, a demodulation and despreader unit, a re-modulator and re-spreader unit and a combiner. The delay circuit produces a delayed version of the received signals and the demodulator and de-spreader unit produces a demodulated and de-spread signal corresponding to one of the received signals. The respreader and remodulator unit produces a remodulated and respread signal from the demodulated and despread signal and the combiner produces a combined signal from the delayed version of the received signals and the remodulated and respread signal. Conceptually, the combined signal is the result of canceling a strong received signal from the other received signals in order to detect a weaker signal within the stronger received signals.

As another example, the cancellation system may also utilize a system architecture that stores the received signals and cancels less than all the received signals from the stored version of the received signals. An implementation of this system architecture may include a matched filter, a storage unit, a remodulator and respreader unit, and a combiner. The storage unit stores the received signals and the matched filter produces a demodulated and despread signal corresponding to one of the received signals. The remodulator and respreader unit produces a remodulated and respread signal from the output of the matched filter and the combiner produces a combined signal from the output of the storage unit and the remodulated and respread signal. Again the combined signal is conceptually the result of canceling a strong received signal from the other received signals in order to detect a weaker signal within the stronger received signals.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principals of the invention. Moreover, in the figures, like reference numerals designate corresponding parts throughout the different views.

DETAILED DESCRIPTION OF THE PREFERRED EMBODIMENTS

A typical GPS system has approximately 12 satellites that may be visible at any one time to a wireless device. Global Positioning System or "GPS" means any system utilizing satellites and/or land-based communications devices for providing or enabling the determination of a location of the wireless device on the earth, for example but not limited to: NAVSTAR, GLONASS, LORAN, Shoran, Decca, or TACAN.

Figure 1:
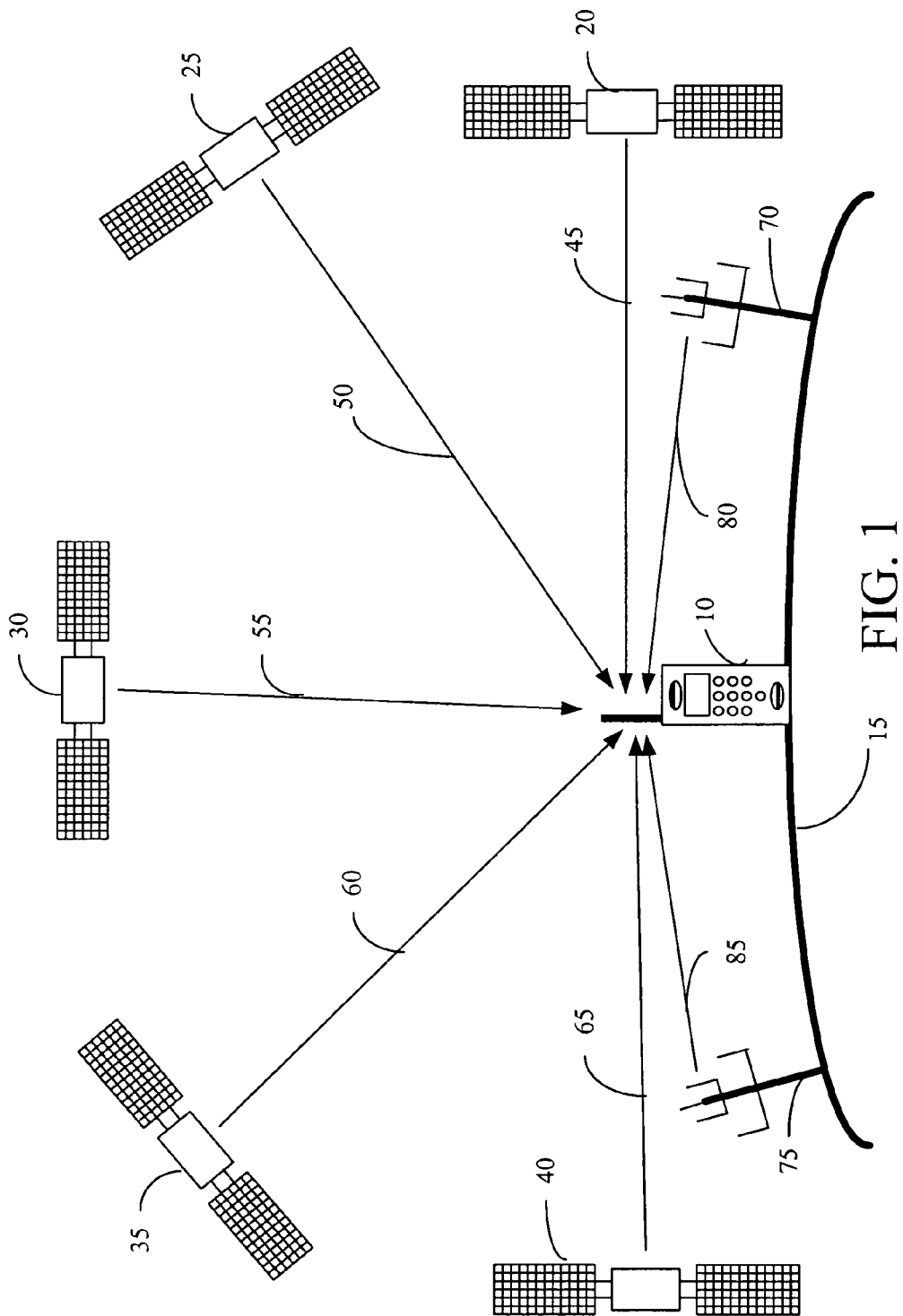
FIG. 1 illustrates a schematic diagram of a wireless device, such as mobile telephone, receiving positional information from a plurality of satellites and pseudolites.

In FIG. 1, a wireless device 10 (such as a mobile or cellular telephone) on the surface of the earth 15 receives positional information from a plurality of satellites and pseudolites (such as base stations). For example, in FIG. 1 five satellites 20, 25, 30, 35 and 40 are shown transmitting to the wireless device 10 via signal paths 45, 50, 55, 60 and 65, respectively. FIG. 1 also shows pseudolites (base stations) 70 and 75 transmitting to the wireless device 10 via signal paths 80 and 85, respectively. Generally the signal strength of the signals received by the wireless device 10, via signal paths 50, 55 and 60, are greater than the signal strength of the signals received by the wireless device 10 via signal paths 45 and 65.

Figure 2:
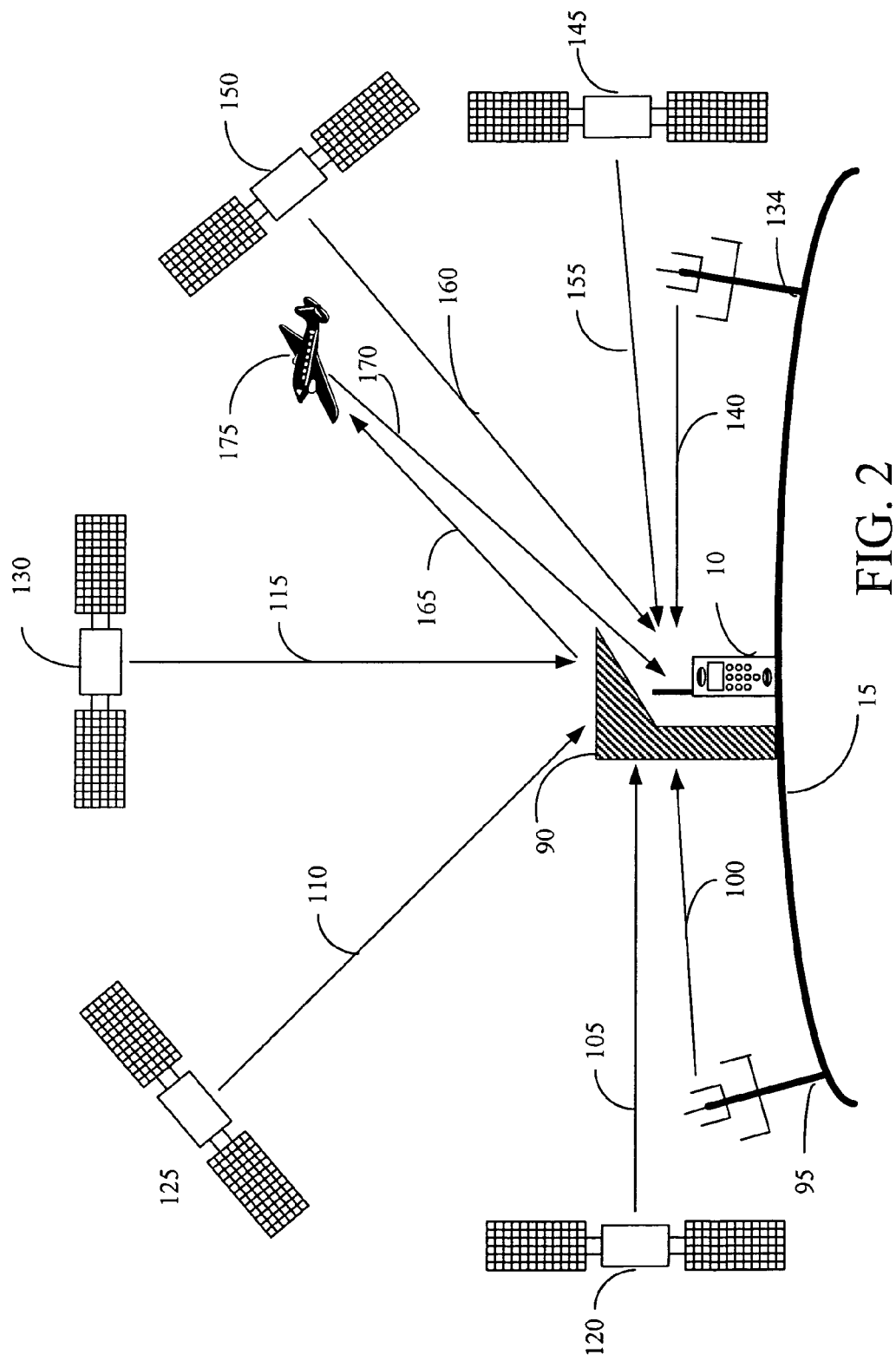
FIG. 2 illustrates a schematic diagram of the wireless device in a position that blocks the reception of some of the available satellites and pseudolites.

FIG. 2 shows an obstruction 90 that blocks the wireless device 10 from receiving signals from some of the pseudolites and/or satellites. Specifically, in FIG. 2 the obstruction 90 blocks the reception of signals from pseudolite 95 (via signal path 100) and satellites 120, 125 and 130 (via signal paths 105, 110 and 115, respectively). The obstruction 90, however, does not block the reception of signals from pseudolite 135 (via signal path 140), satellites 145 and 150 (via signal paths 155 and 160, respectively), and satellite 130 (via a signal multi-path including signal path 115 and reflected signal paths 165 and 170). The reflected signal paths 165 and 170 are reflected from the obstruction 90 and other possible reflective objects such as an airplane 175 and/or a building (not shown). Generally depending on the different signal paths, the strength of the signals received at the wireless device 10 will vary.

Figure 3:
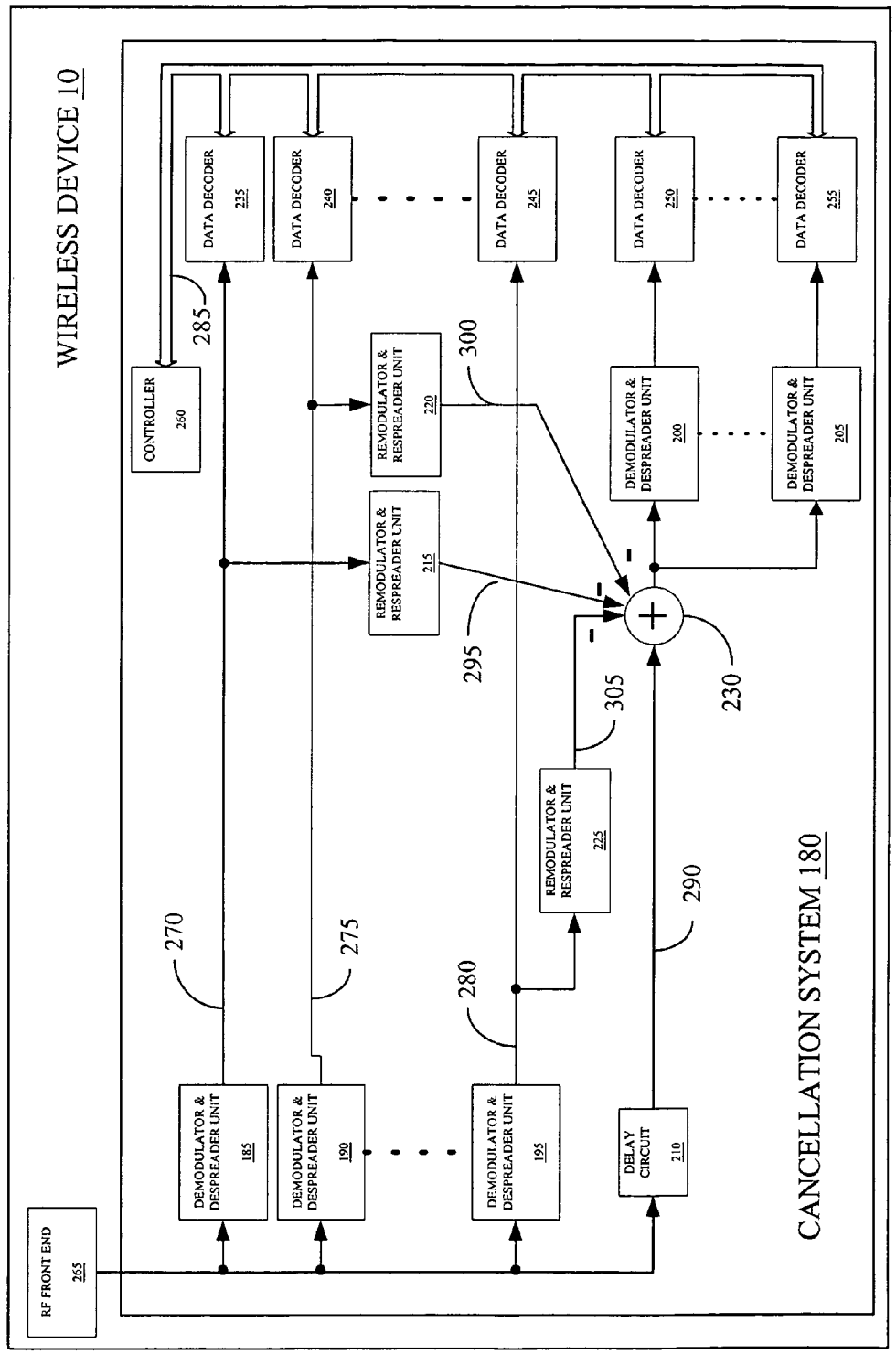
FIG. 3 illustrates a block diagram of the cancellation system located in the wireless device of FIG. 1 and FIG. 2.

FIG. 3 illustrates a cancellation system 180 within the wireless device 10. The cancellation system 180 includes a plurality of demodulator and despreader units 185, 190, 195, 200 and 205, a delay circuit 210, and a plurality of remodulator and respreader units 215, 220 and 225. The cancellation system 180 also includes a combiner 230, a plurality of data decoders 235, 240, 245, 250 and 255, and a controller 260.

The demodulator and despreader units 185, 190 and 195 and the delay unit 210 are in signal communication with a radio frequency (RF) front end 265 of the wireless device 10. The demodulator and despreader units 185, 190 and 195 are also in signal communication with the remodulator and respreader units 215, 220 and 225, and the data decoders 235, 240 and 245 via signal connections 270, 275 and 280, respectively. For illustration purposes, FIG. 3 shows three banks (or channels) of demodulators and despreader units 185, 190 and 195 out of an approximate 12 banks corresponding to the 12 potentially visible satellites. More or less banks may be required based on the GPS system requirements. The demodulator and despreader units 200 and 205 are in signal communication with data decoders 250 and 255 and the plurality of data decoders 235, 240, 245, 250 and 255 are in signal communication with the controller 260 via a signal bus 285. The delay circuit 210 and the plurality of remodulator and respreader units 215, 220 and 225 are in signal communication with the combiner 230 via signal paths 290, 295, 300 and 305 respectively.

As the wireless device 10 receives signals from the plurality of satellites, the received signals are processed by the RF front end 265 and passed to the banks of demodulator and despreader units 185, 190 and 195. The RF front end 265 is a general radio receiver front end including filters, an antenna, and amplifiers that have been designed to receive signals from the satellites and/or pseudolites. Examples of the RF front end 265 may selectively be a "Gemini/Pisces Monopack R6732-13" integrated circuit available from Conexant Systems, Inc., "GRF1 SiRFstarI" and "GRF2i SiRFstarIIe" architectures available from SiRF Technology, Inc., "MGPSCS-A1" GPS Chipset, "PSRF111A" RF module, and/or "MRFIC1502" Integrated GPS down converter from Motorola, Inc., and/or the "UAA1570HL" GPS front-end receiver circuit from Philips, Inc.

The received signals are then processed by the demodulator and despreader units 185, 190 and 195 and passed to the data decoders 235, 240 and 245 and the remodulator and respreader units 215, 220 and 225, respectively. The demodulator and despreader units 185, 190 and 195 first demodulate the received signals by removing the carrier signal components of the received signals and then despread the demodulated received signals by despreading the signals with the PN codes corresponding to the different satellites. The data decoders 235, 240 and 245 receive the demodulated and despread signals from the demodulator and despreader units 185, 190 and 195 (via signal connections 270, 275 and 280) and decode any data contained on the demodulated and despread signals.

The controller 260 controls and monitors the operation of the data decoders 235, 240, 245, 250 and 255 via the signal bus 285. The controller 260 monitors the decoding process of the data decoders 235, 240, 245, 250 and 255 and determines if a sufficient number of satellites have been identified in order to calculate the location of the wireless device 10. Three satellites are needed to calculate the location of the wireless device 10 in terms of latitude and longitude and four satellites are needed to calculate the location of the wireless device 10 in terms of latitude, longitude and altitude. The controller 260 may be any general-purpose processor such as an Intel XXX86, Motorola 68XXX or PowerPC, or other equivalent processor. Alternatively, a GPS-specific circuit or oriented device may selectively be utilized. Additionally, the controller 260 may also be integrated into a signal semiconductor chip such as an Application Specific Integrated Chip (ASIC) or Reduced Instruction Set Computer (RISC), or may be implemented via a Digital Signal Processor (DSP) chip. Examples of GPS-oriented devices include the "Scorpio 11577-11" digital integrated circuit produced by Conexant Systems, Inc., "GSP1 SiRFstar I" and "GSP2e SiRFstart II" architectures available from SiRF Technology, Inc., "MGP-SCS-A1" and "MMC2003" from Motorola, Inc., and the "SAA1575HL" GPS baseband processor from Philips, Inc.

For example, if an insufficient number of satellites have been identified, the controller 260 first determines how many satellites have been properly identified and then proceeds to search for additional satellite signals by removing the identified signals from the received signals. This procedure basically power filters the received signals from the RF front end 265 by removing the higher power satellite signals from the received signals. In this manner the cancellation system 180 compensates for the varying received signal strengths and detects the lower power (i.e., weaker) received signals that would normally be hidden by the higher power received signals.

The controller 260 performs this power filtering by instructing the remodulator and respreader units 215, 220 and 225 to remodulate and respread the signals received via signal connections 270, 275 and 280 and send the resulting signals to the combiner 230 via signal connections 295, 300 and 305, respectively. The combiner 230 is a general arithmetic circuit that combines the signals from signal connections 295, 300 and 305 with the signal from the delay circuit 210. The delay circuit 210 is a circuit that delays the received signal from the RF front end 265 by a time delay equal to the time necessary to propagate a signal from the RF front end 265 through one of the demodulator and despread units 185, 190 or 195 and one of the remodulator and respreader units 215, 220 or 225 to the combiner 230.

The combiner 230 then subtracts the signals (received via signal connections 295, 300 and 305) from the delayed signal (received via signal connection 290) and sends the result to demodulator and despreader units 200 and 205, which demodulate and despread the resultant signal in a fashion similar to demodulator and despreader units 185, 190 and 195. The resulting demodulated and despread signals are then decoded for satellite information data via data decoders 250 and 255. The data decoders 250 and 255 utilize the information from the demodulator and despreader units 200 and 205 to determine the range or pseudo-range measurements.

If the $C/N_0$ (signal to noise density ratio) is sufficient to detect a satellite and if the operation of the cancellation system 180 is continuous in nature, a 50 Hz data signal from a satellite may also selectively be demodulated. The 50 Hz data signal is a low frequency modulated data signal on the PN code transmission that represents the updated orbital location of the satellites.

It is appreciated for illustration purposes that only two of the approximate 12 demodulator and despreader units are shown (185 and 190 in FIG. 3). It is also appreciated for illustration purposes, that only a two-stage system has been shown (one stage being before the combiner 230 and the second stage being after the combiner 230 in FIG. 3), however, the system may be extended to multiple stages by repeating the utilization of additional delay circuits, demodulator and despreader units, remodulator and respreader units and combiners after the combiner 230. The output of each of the combiners, in each stage, may then be utilized to provide signals to additional demodulator and despreader units. It is appreciated that the number of stages employed is determined by the implementation practicalities.

As another example, if an insufficient number of satellites have been identified, the controller 260 also monitors the decoding process of data decoders 250 and 255 searching for power filtered satellite signals. Again for illustration purposes only two of the approximate 12 data decoders have been shown. In this example, signals from the demodulator and despreader units 185, 190 and 195 are automatically remodulated and respread by remodulator and respreader units 215, 220 and 225 and the outputs combined in the combiner 230 with the delayed signal from the delay circuit 210. The resultant signals from the combiner 230 are then demodulated and despread with demodulator and despreader units 200 and 205 and the data is decoded with data decoders 250 and 255. The demodulation, despreading, remodulation, respreading and signal removal operations may because the delay circuit 210 may be configured as a storage device such as random access memory (RAM) or other static memory realization.

Figure 4:
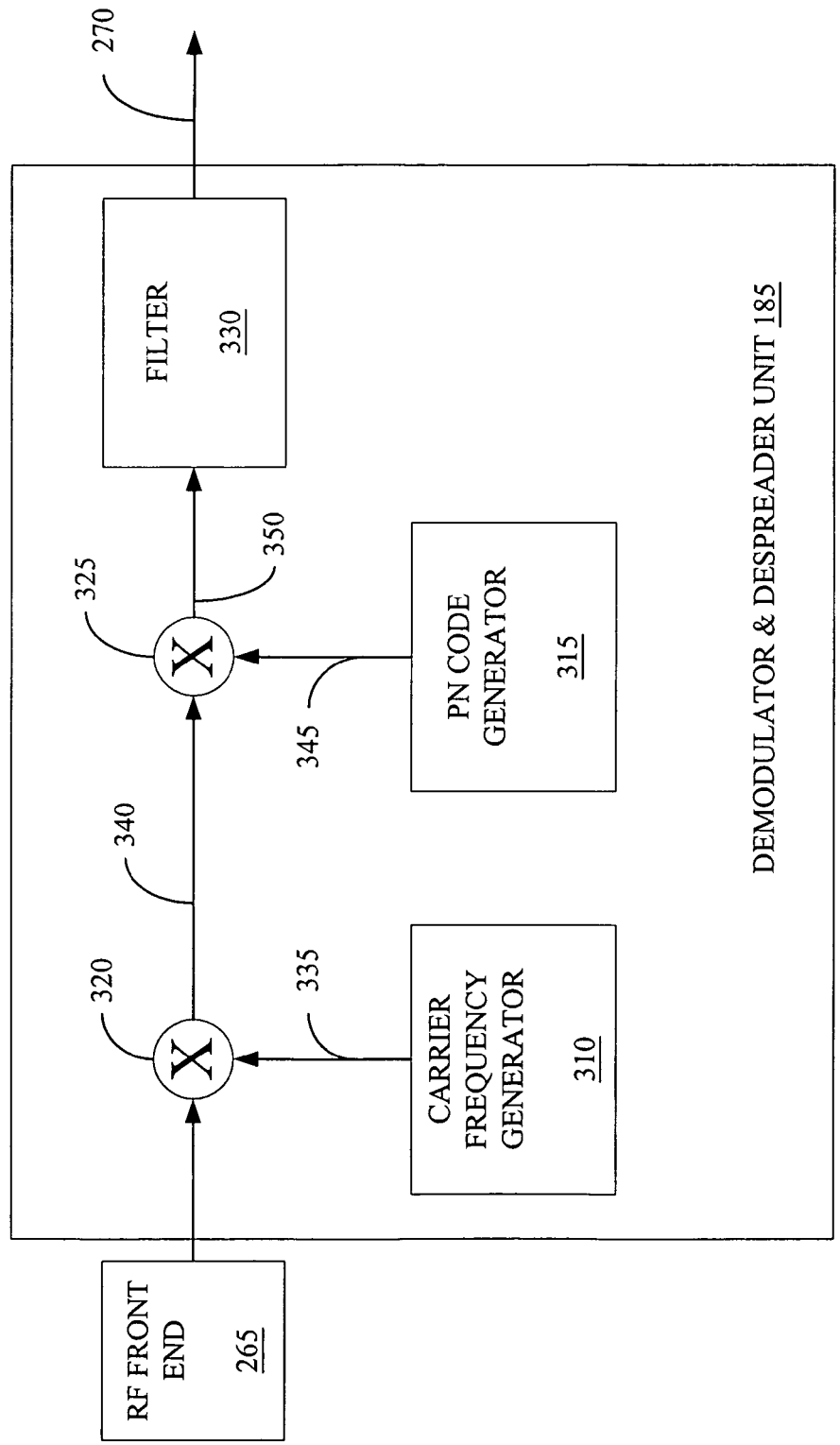
FIG. 4 illustrates a block diagram of one of the demodulator and despreader units shown in FIG. 3.

FIG. 4 is an example implementation of a demodulator and despreader unit such as demodulator and despreader unit 185. The demodulator and despreader unit 185 includes a carrier frequency generator 310, a pseudo noise (PN) code generator 315, a pair of signal mixers 320 and 325, and a filter 330. The PN code is a binary code corresponding to the PN code for a specific satellite. The first mixer 320 is in signal communication with the RF front end 265 and the carrier frequency generator 310 via signal connection 335. The second mixer 325 is in signal communication with the first mixer 320, the PN code generator 315, and the filter 330, via signal connections 340, 345 and 350. The filter 330 is in signal communication with the remodulator and respreader unit 215, FIG. 3, and data decoder 235 via signal connection 270.

The first mixer 320 utilizes the carrier frequency generator 310 to remove the carrier signal from the received signal (i.e., demodulate) from the RF front end 265 and the second mixer 325 utilizes the PN code generator 315 to despread the demodulated signal from the first mixer 320. The filter 330 then removes any harmonics and other unnecessary frequency components from the demodulated and despread signal and outputs the resulting signal via signal connection 270.

Figure 5:
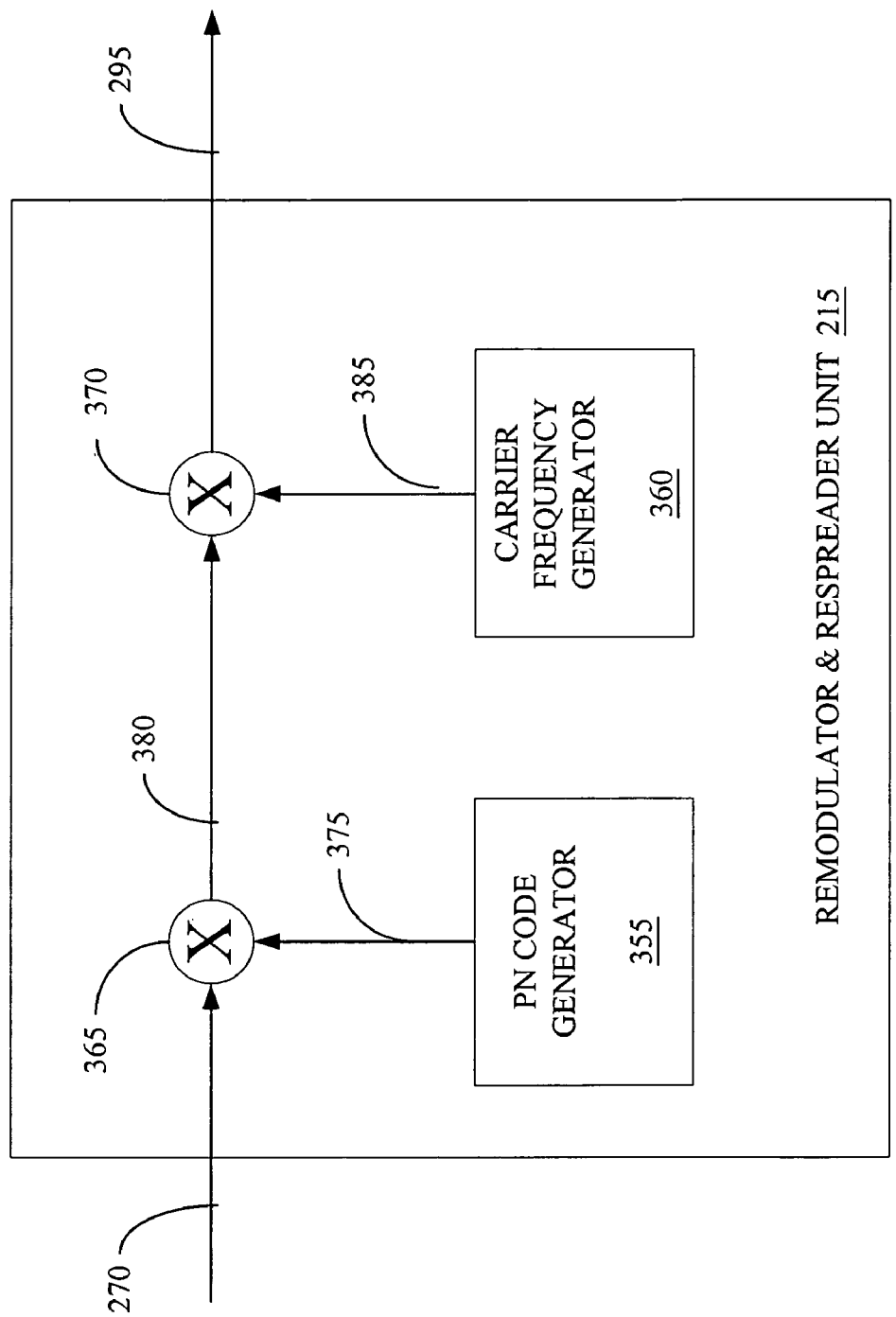
FIG. 5 illustrates a block diagram of one of the remodulator and respreader units shown in FIG. 3.

FIG. 5 is an example implementation of the remodulator and respreader unit 215. The remodulator and respreader unit 215 includes a PN code generator 355, a carrier frequency generator 360 and a pair of signal mixers 365 and 370. The first mixer 365 is in signal connection with the filter 330, FIG. 4, via signal connection 270, FIG. 5, and the PN code generator 355 via signal connection 375. The second mixer 370 is in signal communication with the first mixer 365, the carrier frequency generator 360, and the combiner 230, FIG. 3, via signal connections 380, FIGS. 5, 385 and 295. The PN code generator 355 generates the same PN code utilized by the corresponding demodulator and despreader unit. As an example the PN code utilized by remodulator and respreader unit 215, FIG. 3, is the same as the PN code utilized by demodulator and despreader unit 185.

The first mixer 365 utilizes the PN code generator 355 to spread the signal received (via signal connection 270) and the second mixer 370 utilizes the carrier frequency generator 360 to add a carrier signal (i.e., modulate) to the spread signal from the first mixer 365. The second mixer 370 then sends the resulting signal to the combiner 230, FIG. 3.

Figure 6:
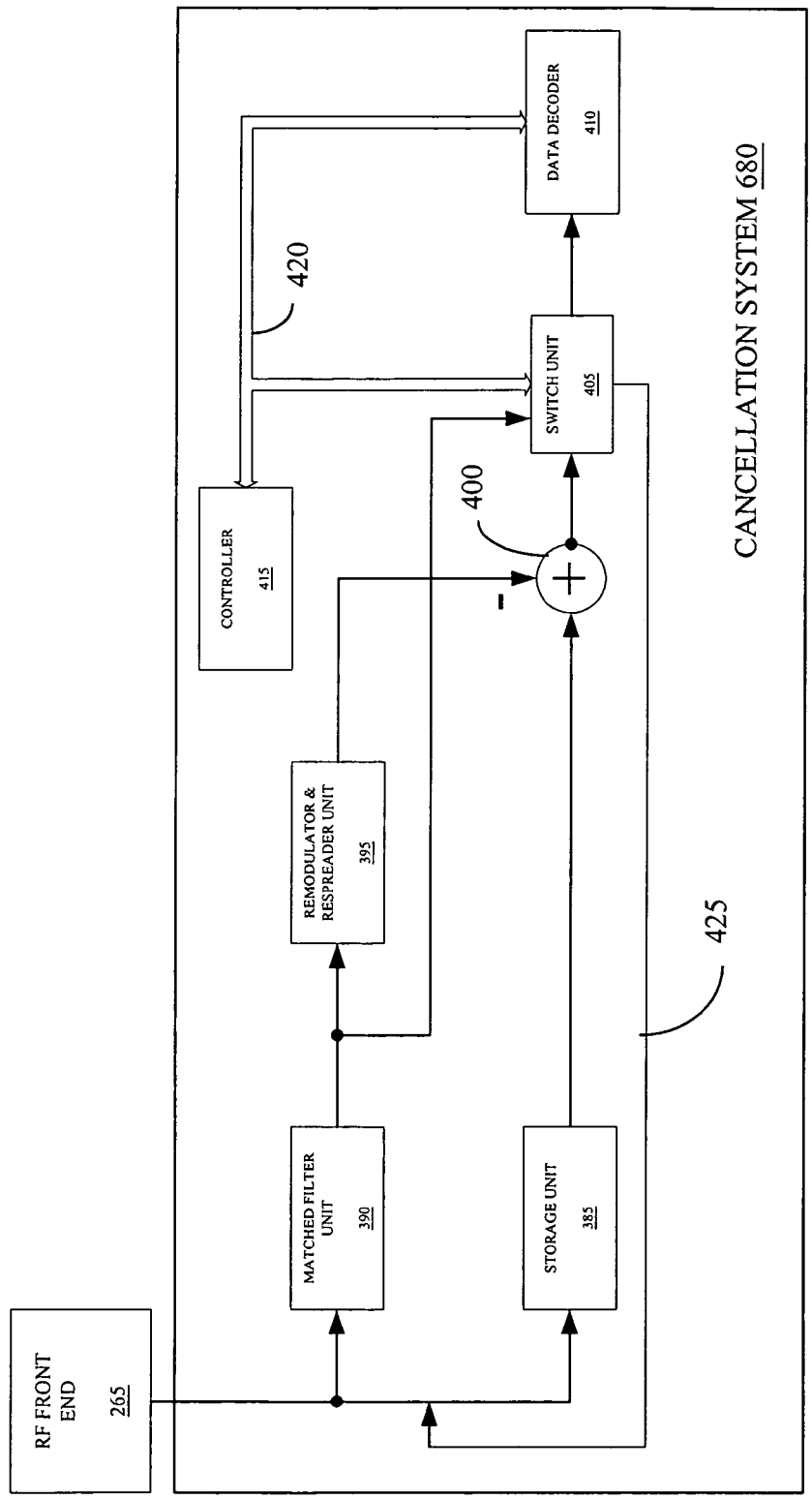
FIG. 6 illustrates a block diagram of the cancellation system located in the wireless device of FIG. 1 and FIG. 2 using a matched filter structure.

FIG. 6 shows an example matched filter implementation of the cancellation system 680. The cancellation system 680 includes a storage unit 388 (such as RAM), a matched filter unit 390, a remodulator and respreader unit 395, a combiner 400, a switch unit 405, a data decoder 410, and a controller 415. In this example implementation, the matched filter unit 390, remodulator and respreader unit 395, and storage unit 388 are preferably utilized in a recursive fashion, instead of utilizing a plurality of demodulator and despreader units and remodulator and respreader units as shown in FIG. 3. Thus the storage unit 388, matched filter unit 390, remodulator and respreader unit 395 and combiner 400 would be utilized multiple times. As a signal is received from the RF front end 265, it is passed to the matched filter unit 390 and the storage unit 388. The received signal is then processed by the matched filter unit 390 that produces a demodulated and despread signal for a specific satellite. The output of the matched filter 390 is remodulated and respread by the remodulator and respreader unit 395 and removed from the received signals stored in the storage unit 388 by the combiner 400.

In addition to producing a demodulated and despread signal for a specific satellite, the matched filter unit 390 also estimates the signal amplitude and the carrier and code frequency and phase values. These values may be utilized to set the remodulator and respreader unit 395 to accurately remove the detected strong signal. If the controller 415 determines that sufficient signals have been obtained to determine the position of the wireless device 10, the controller 415 instructs the switch 405, via a controller bus 420, to send the combined signal to a data decoder 410 to decode the signal.

If the controller 415 instead determines that additional signals are needed, the controller 415 instructs the switch 405, via the control bus 420, to send the result from the combiner 400 back to the matched filter unit 390 and the storage unit 388 via the feedback signal path 425. The process then repeats using the same matched filter 390 and remodulator and respreader unit 395 on the new combined signal from the combiner 400. This process is iterated until the controller 415 determines that a sufficient number of signals have been detected to calculate the position of the wireless device 10. The matched filter 390 and the remodulator and respreader unit 395 may have selectively the same physical circuitry (such as one integrated circuit), applied multiple times by the controller 415. It is appreciated that the combination of the matched filter unit 390 and remodulator and respreader unit 395 may be selectively repeated in multiple stages instead of using an iterative feedback approach without deviating from the implementation described.

An advantage of using the matched filter 390 is that the detection of the stronger signals also provides a reference for the amplitude and phase of the strong signals to be cancelled out. These estimates are inherently related to the stored data from which the strong signals will be removed, and then reprocessed by the matched filter 390 in searching for the next strongest signal. This process functions particularly well with spread spectrum systems like GPS and GLONASS because the residuals of the strong signals that are not removed still appear as uncorrelated noise relative to the signals still to be detected.

Figure 7:
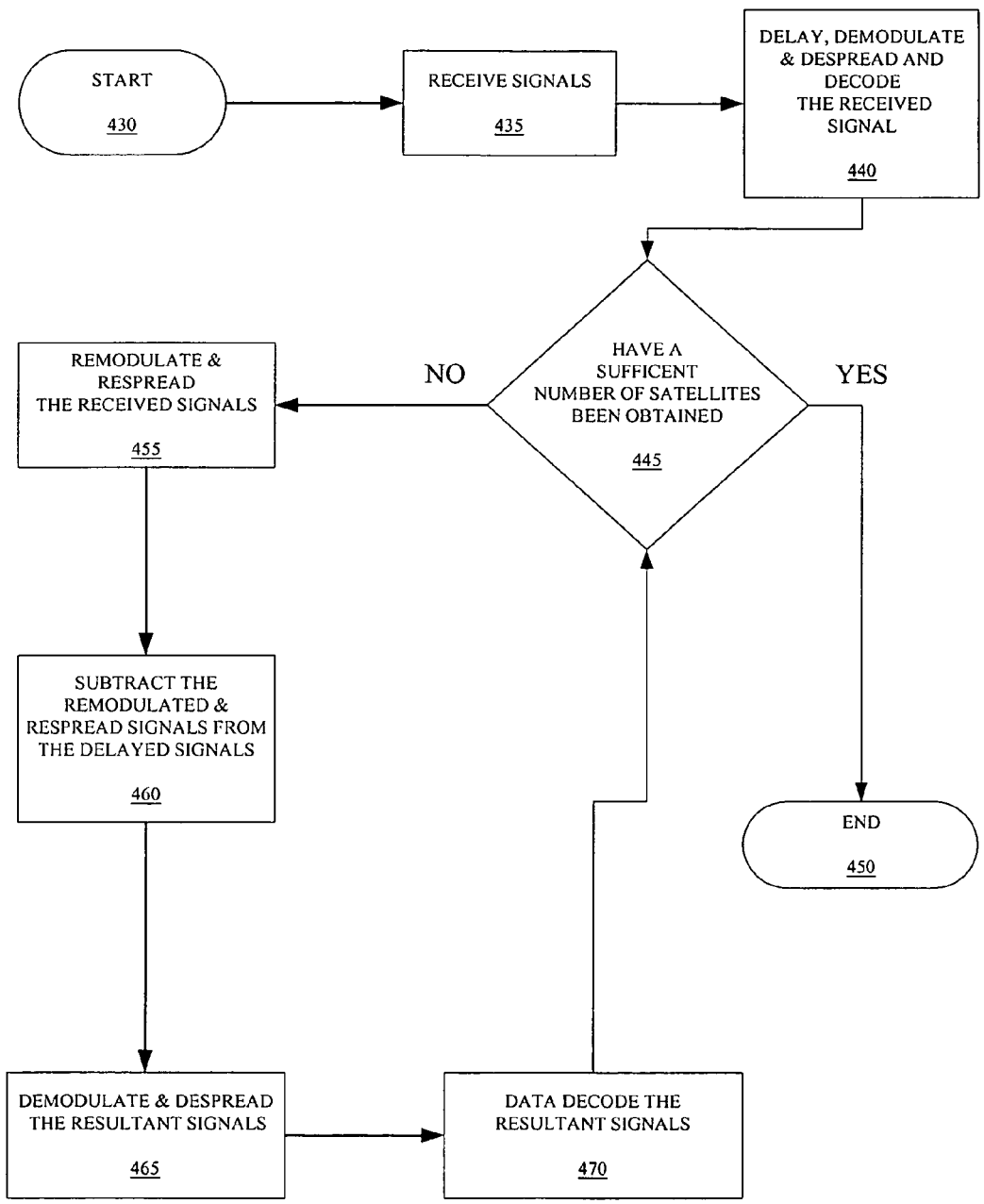
FIG. 7 illustrates a flowchart illustrating the process performed by the cancellation system of FIG. 3.

FIG. 7 illustrates the process performed by the cancellation system 180 (illustrated in FIG. 3). When the process begins 430, the RF front end 265 (illustrated in FIG. 3) receives a plurality of signals 435 from the plurality of satellites and sends the received signals to the cancellation system 180 (illustrated in FIG. 3). As the process continues 440, the cancellation system 180 processes the received signals by delaying the received signals with a delay circuit 210 (illustrated in FIG. 3) to create a delay signal, and demodulating and despreading the received signals with a plurality of demodulator and despreader units to create a plurality of demodulated and desrpread signals that are sent to both a plurality of data decoders and a plurality of remodulator and respreader units. If the controller 260 (illustrated in FIG. 3) determines 445 that a sufficient number of satellite signals have been obtained to calculate the location of the wireless device 10 (illustrated in FIG. 3), the process ends 450.

If instead the controller 260 determines 445 that an insufficient number of satellite signals have been obtained, the cancellation system 180 respreads and remodulates 455 the signals obtained from the demodulation and despreader units and sends the results to combiner 230 (illustrated in FIG. 3). The combiner 230 subtracts 460 the respread and remodulated signals from the delayed signal produced by the delay circuit 210, which impedes the delayed signal by the time necessary to propagate a signal from the RF front end 265 through one of the demodulator and despread units 185, 190 or 195 and one of the remodulator and respreader units 215, 220 or 225 to the combiner 230.

The cancellation system 180 then demodulates and despreads 465 the output from the combiner 230 and passes the demodulated and despread output of the combiner 230 to the data decoders that decode 470 the demodulated and despread output of the combiner 230. If the cancellation system 180 has obtained a sufficient number of satellites 445, the process ends 450. If any additional satellites are still needed 445 the process repeats 455 through 470 until a sufficient number of satellites are obtained.

Figure 8:
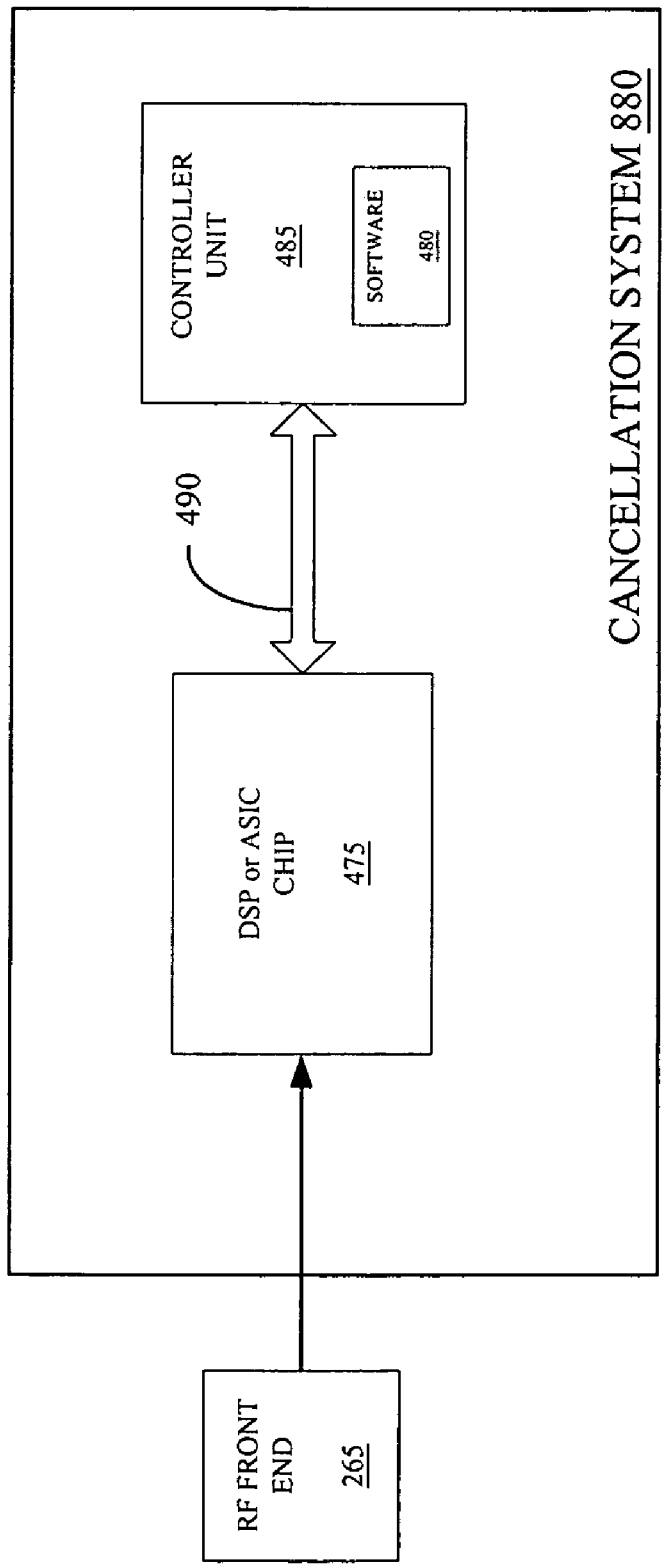
FIG. 8 illustrates a block diagram of the cancellation system located in the wireless device of FIG. 1 and FIG. 2 using a Digital Signal Processor (DSP) or Application Specific Integrated Circuit (ASIC) chip.

FIG. 8 is a block diagram of the cancellation system 880 located in the wireless device 10 utilizing a Digital Signal Processor (DSP) or Application Specific Integrated Circuit (ASIC) chip 475. The cancellation system 880 may be selectively implemented in software, hardware, or a combination of hardware and software. For example, the elements of the cancellation system 880 may be implemented in software 480 stored in a memory located in a controller unit 485. The controller unit 485 is in signal communication with the DSP or ASIC chip 475 via communication link 490 (which may selectively be a system bus). The software 480 configures and drives the DSP or ASIC chip 475 and performs the steps illustrated in FIG. 7.

The software program 480 comprises an ordered listing of executable instructions for implementing logical functions. The software 480 may be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" is any means that may contain, store, communicate, propagate, or transport the program for use by or in connection with the instruction execution system, apparatus, or device. The computer readable medium may be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 9:
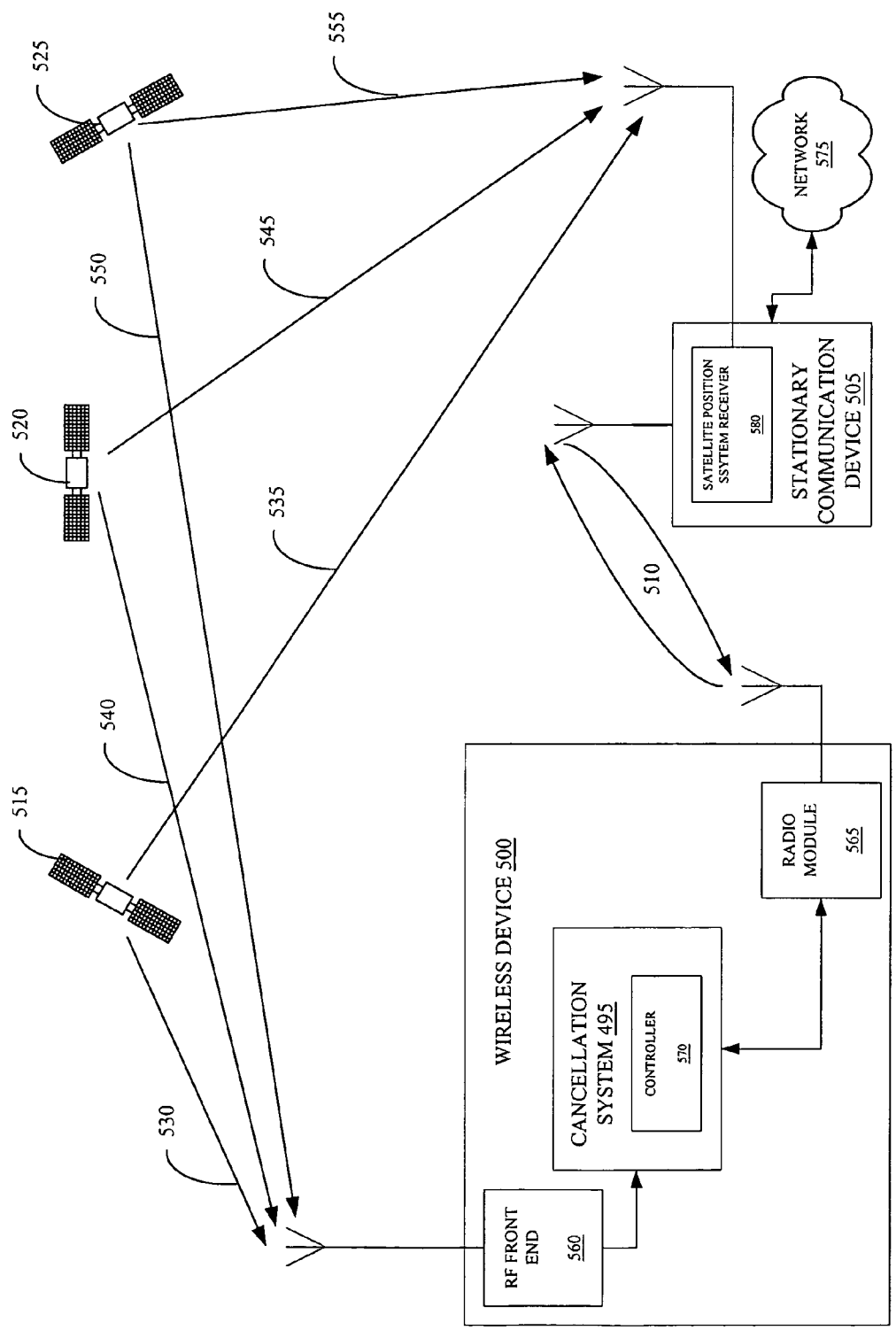
FIG. 9 illustrates a schematic diagram of an example implementation of the cancellation system in a network assisted wireless environment.

FIG. 9 illustrates an example implementation of the cancellation system 495 in a network assisted wireless environment. FIG. 9 shows a wireless device 500 (such as a cellular telephone or other mobile device) in signal communication with a stationary communication device 505 (such as a base station or other network communication device) via signal path 510. Both the wireless device 500 and the stationary communication device 505 receive signals from a number of satellites 515, 520 and 525 via signal paths 530, 535, 540, 545, 550 and 555, respectively.

The wireless device 500 includes a RF front end 560 (similar to RF front end 265 in FIG. 3), the cancellation system 495, FIG. 9, and a radio module 565. The cancellation system 495, which includes a controller 570, is similar to the implementation of the cancellation system 180 in FIG. 3. The wireless device 500, FIG. 9, receives signals from the satellites 515, 520 and 525 and the cancellation system 495 detects the lower power signals by power filtering all the received signals in a manner similar to previous implementations described in FIG. 1 through FIG. 8.

The main difference in the implementation illustrated in FIG. 9 is the use of a network 575 to assist the cancellation system 495 in power filtering the received signals. The stationary communication device 505 is part of the network 575 and includes a satellite positioning system receiver 580 that receives satellite data messages or signals from the satellites 515, 520 and 525. The stationary communication device 505 is assumed to receive the signal approximately error free because it will have a clear view of the sky and will not have any obstructions blocking the signals. In the network 575 there may be numerous devices similar to the stationary communication device 505. For convenience only one stationary communication device 505 is shown, however, it is appreciated that the following description is equally valid with multiple stationary communication devices. Additionally, only three of the approximately 12 available satellites in a GPS system are shown.

Figure 10:
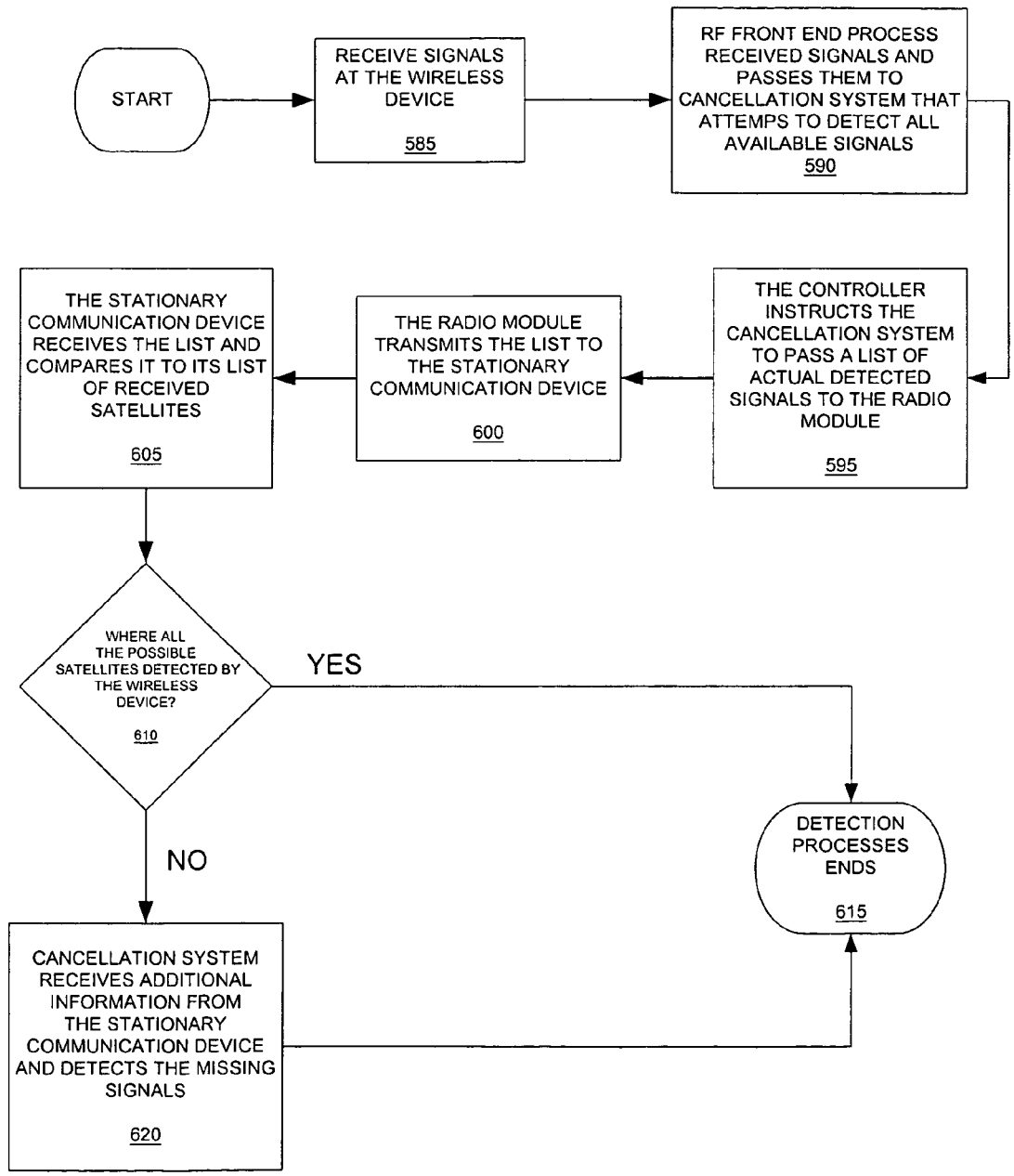
FIG. 10 illustrates a flowchart illustrating an example process performed by the implementation described in FIG. 9.

FIG. 10 illustrates an example process performed by the implementation described in FIG. 9. When the process begins the wireless device 500 (illustrated in FIG. 9) receives numerous signals 585 from satellites 515, 520 and 525 (illustrated in FIG. 9) via signal paths 530, 540 and 550 (illustrated in FIG. 9). The RF front end 560 (illustrated in FIG. 9) processes 590 the received signals and passes them to the cancellation system 495 (illustrated in FIG. 9), which attempts to detect all the available signals. The controller 570 (illustrated in FIG. 9) instructs 595 the cancellation system 495 to pass a list (i.e., record) of the actual detected signals to the radio module 565 (illustrated in FIG. 9). The radio module 565 transmits 600 the list to the stationary communication device 505 (illustrated in FIG. 9) via signal path 510. The stationary communication device 505 receives the list 605 and compares it to its own generated list of received satellite signals via signal paths 535, 545 and 555 (illustrated in FIG. 9). The stationary communication device 505 then responds 610 to the wireless device 500, via signal path 510 (illustrated in FIG. 9) with either an acknowledgement that the cancellation system 495 has indeed detected all the possible received signals from the satellites or additional information to assist the cancellation system 495 to detect the remaining needed signals. If the stationary communication device 505 sends an acknowledgement 610, the wireless device 500 receives the response from the stationary communication device 505 and the controller 570 (illustrated in FIG. 9) instructs the cancellation system 495 that the detection process is over 615.

If instead, the stationary communication device 505 determines that the wireless device did not detect all the available satellites 610 the stationary communication device 505 then additionally transmits a record that includes information to assist the cancellation system 495. The record may include satellite location, power, frequency, phase and other data that will help the cancellation system 495 detect the missing signals. The wireless device 500 receives this record 620 and the controller 570 instructs the cancellation system 495 to detect the missing signals based on the received record. The process then ends 615.

Figure 11:
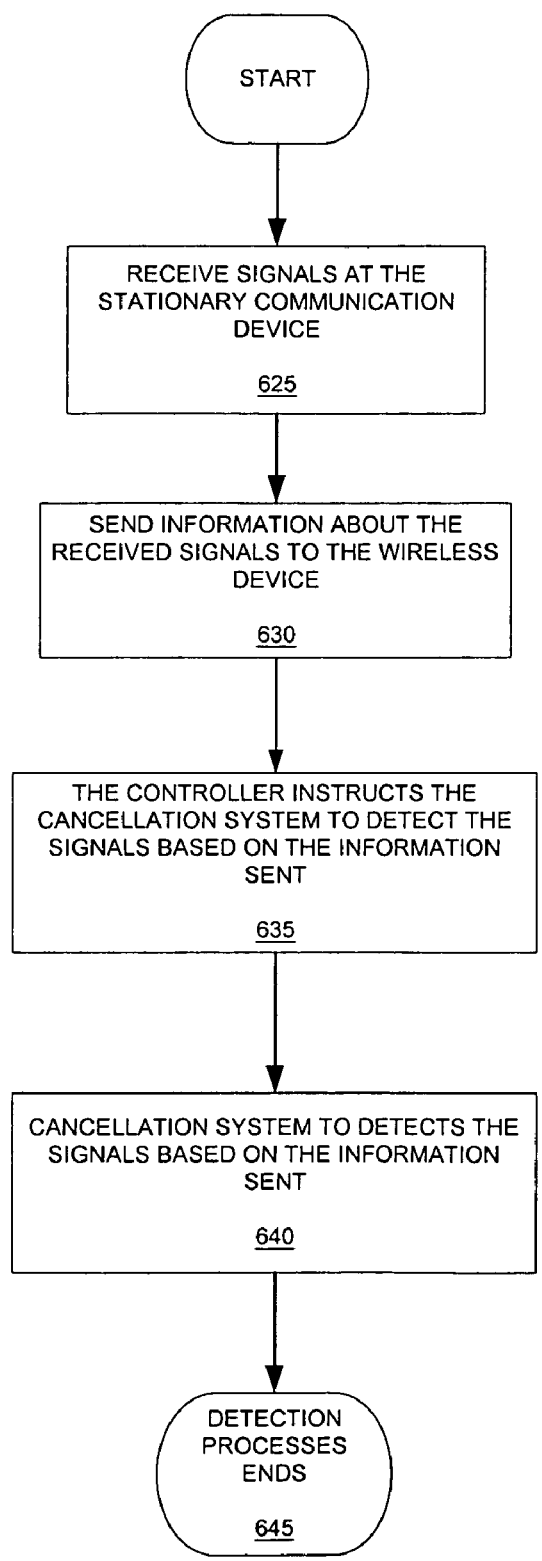
FIG. 11 illustrates a flowchart illustrating another example process performed by the implementation described in FIG. 9.

FIG. 11 illustrates another example process performed by the implementation described in FIG. 9. When the process begins the stationary communication device 505 (illustrated in FIG. 9) receives 625 numerous signals from satellites 515, 520 and 525 (illustrated in FIG. 9) via signal paths 535, 545 and 555 (illustrated in FIG. 9). The stationary communication device 505 generates a record that includes a list of available satellites and stored information including satellite location, power, frequency, phase and other data that will help the cancellation system 495 detect the satellite signals. The stationary communication device 505 sends the record 630 to the wireless device 500 (illustrated in FIG. 9) via signal path 510 (illustrated in FIG. 9). The controller 570 (illustrated in FIG. 9) instructs 635 the cancellation system 495 (illustrated in FIG. 9) to detect the available satellite systems based on the record from the stationary communication device 505. The cancellation system 495 then detects 640 the received signals by power filtering the strong signals and detecting the weaker signal based on the record from the stationary communication device 505. The process then ends 645.

The geographic position of a wireless device may be calculated once a sufficient number of satellite signals are received at the wireless device. U.S. Pat. No. 5,812,087 entitled "Method and Apparatus For Satellite Positioning System Based Time Measurement," issued to Norman F. Krasner on Sep. 22, 1998, which is incorporated by reference, describes a method and apparatus for measuring time related to satellite data signals in satellite positioning systems. The measured time is used to calculate the position of the wireless device. U.S. Pat. No. 5,812,087 discloses the method and apparatus for establishing receiver timing at the wireless device by having a GPS receiver of the wireless device form an estimate of a portion of the satellite data message and transmit the estimate to a base station. The base station compares this estimate with a record of the satellite data signals received from another GPS receiver at the base station. The comparison determines which portion of the base station's data most closely matches the data transmitted by the wireless device and the result of the comparison is transmitted back to the wireless device for reference. The time measurements may also be implemented in the system described in U.S. Pat. No. 5,945,944, entitled "Method And Apparatus For Determining Time For GPS Receivers," issued to Norman F. Krasner on Aug. 31, 1999, which is incorporated by reference.

U.S. Pat. No. 5,945,944 discloses a method and apparatus of determining the time for a global positioning system receiver. Timing signals derived from a communication system, such as cellular phone transmission signals, are received by a GPS receiver and decoded to provide accurate time information. The timing signals may be in the form of synchronized events marked by timing indicators, or as system time information. The timing signals in combination with satellite position signals received by the GPS receiver are used to determine the position of the GPS receiver. The time measurements may also be implemented in an obstructive environment by the system described in U.S. Pat. No. 5,831,574, entitled "Method And Apparatus For Determining the Location Of An Object Which May Have An Obstructed View Of The Sky," issued to Norman F. Krasner on Nov. 3, 1998 and U.S. Pat. No. 6,016,119, entitled "Method And Apparatus For Determining The Location Of An Object Which May Have An Obstructed View Of The Sky," issued to Norman F. Krasner on Jan. 18, 2000, which are both incorporated by reference.

U.S. Pat. No. 5,831,574 discloses a positioning sensor that receives and stores a predetermined record length of positioning signals while in a fix position located such that the positioning sensor can receive positioning signals. Thereafter, the stored positioning signals are processed to determine the geographic location of the fix position. The fix position may correspond to a location of an object of interest or it may be in a known location relative to the position of the object, in which case once the geographic location of the fix position has been computed, the geographic location of the object can be derived. The positioning sensor includes a Snapshot GPS receiver which may collect and process GPS signals transmitted by GPS satellites using fast convolution operations to compute pseudoranges from the GPS satellites to the fix position. Alternatively, these computations may be performed at a basestation. The computed pseudoranges may then be used to determine the geographic location of the fix position. The positioning sensor may be equipped with a depth sensing elements, such as a pressure sensor, which allows a determination of the depth of a submerged object to be made. The positioning sensor may further be equipped with signal detecting means for determining when the positioning sensor is in the fix position.

U.S. Pat. No. 6,016,119 discloses a positioning sensor which receives and stores a predetermined record length of positioning signals while in a fix position located such that the positioning sensor can receive positioning signals. Thereafter, the stored positioning signals are processed to determine the geographic location of the fix position. The fix position may correspond to a location of an object of interest or it may be in a known location relative to the position of the object, in which case once the geographic location of the fix position has been computed, the geographic location of the object can be derived. The positioning sensor includes a Snapshot GPS receiver which may collect and process GPS signals transmitted by GPS satellites using fast convolution operations to compute pseudoranges from the GPS satellites to the fix position. Alternatively, these computations may be performed at a basestation. The computed pseudoranges may then be used to determine the geographic location of the fix position. The positioning sensor may be equipped with depth sensing means, such as a pressure sensor, which allows a determination of the depth of a submerged object to be made. The positioning sensor may further be equipped with signal detecting means for determining when the positioning sensor is in the fix position.

After processing by the cancellation system, the wireless device may make the time measurements based on the system described in U.S. Pat. No. 5,884,214, entitled "GPS Receiver And Method For Processing GPS Signals," issued to Norman F. Krasner on Mar. 16, 1999, which is incorporated by reference. U.S. Pat. No. 5,884,214 discloses a global positioning system (GPS) receiver having first circuitry for receiving and processing pseudorandom sequences transmitted by a number of GPS satellites. The first circuitry is configured to perform conventional correlation operations on the received pseudorandom sequences to determine pseudoranges from the GPS receiver to the GPS satellites. The GPS receiver also includes second circuitry coupled to the first circuitry. The second circuitry is configured to receive and process the pseudorandom sequences during blockage conditions. The second circuitry processes the pseudorandum sequences by digitizing and storing a predetermined record length of the received sequences and then performing fast convolution operations on the stored data to determine the pseudoranges. The GPS receiver may have a common circuitry for receiving GPS signals from in view satellites and downconverting the RF frequency of the received GPS signals to an intermediate frequency (IF). The IF signals are split into two signal path, a first of which provides the conventional correlation processing to calculate the pseudoranges. During blockage conditions, the IF signal is passed to the second signal path wherein the IF signals are digitized and stored in memory and later processed using the fast convolution operations to provide the pseudoranges. Alternative arrangements for the two signal paths include separate downconverters or shared digitizers. One embodiment provides both signal paths on a single integrated circuit with shared circuitry executing computer readable instructions to perform GPS signal processing appropriate to the reception conditions.

Additionally, the wireless device may make the time measurements based on the system described in U.S. Pat. No. 5,781,156, entitled "GPS Receiver And Method For Processing GPS Signals", which is incorporated by reference. U.S. Pat. No. 5,781,156 discloses a GPS receiver in one embodiment which includes an antenna which receives GPS signals at an RF frequency from in view satellites; a downconverter coupled to the antenna for reducing the RF frequency of the received GPS signals to an intermediate frequency (IF); a digitizer coupled to the downconverter and sampling the IF GPS signals at a predetermined rate to produce sampled IF GPS signals; a memory coupled to the digitizer storing the sampled IF GPS signals (a snapshot of GPS signals); and a digital signal processor (DPS) coupled to the memory and operating under stored instructions thereby performing Fast Fourier Transform (FFT) operations on the sampled IF GPS signals to provide pseudorange information. These operations typically also include preprocessing and post processing of the GPS signals. After a snapshot of data is taken, the receiver front end is powered down. The GPS receiver in one embodiment also includes other power management features and includes, in another embodiment the capability to correct for errors in its local oscillator which is used to sample the GPS signals. The calculation speed of pseudoranges, and sensitivity of operation, is enhanced by the transmission of the Doppler frequency shifts of in view satellites to the receiver from an external source, such as a basestation in one embodiment of the invention.

Additionally, an example implementation of the time measurement utilizing the assistance of a base station may be implemented in the system described in U.S. Pat. No. 5,874,914, entitled "GPS Receiver Utilizing A Communication Link," issued to Norman F. Kasner on Feb. 23, 1999, which is incorporated by reference. U.S. Pat. No. 5,874,914 discloses a GPS receiver in one embodiment which includes an antenna which receives GPS signals at an RF frequency from in view satellites; a downconverter coupled to the antenna for reducing the RF frequency of the received GPS signals to an intermediate frequency (IF); a digitizer coupled to the downconverter and sampling the IF GPS signals at a predetermined rate to produce sampled IF GPS signals; a memory coupled to the digitizer storing the sampled IF GPS signals (a snapshot of GPS signals); and a digital signal processor (DPS) coupled to the memory and operating under stored instructions thereby performing Fast Fourier Transform (FFT) operations on the sampled IF GPS signals to provide pseudorange information. These operations typically also include preprocessing and post processing of the GPS signals. After a snapshot of data is taken, the receiver front end is powered down. The GPS receiver in one embodiment also includes other power management features and includes, in another embodiment, the capability to correct for errors in its local oscillator which is used to sample the GPS signals. The calculation speed of pseudoranges, and sensitivity of operation, is enhanced by the transmission of the Doppler frequency shifts of in view satellites to the receiver from an external source, such as a basestation in one embodiment of the invention.

Additionally, another example implementation of the time measurement utilizing the assistance of a base station may be implemented in the system described in U.S. Pat. No. 5,841,396, entitled "GPS Receiver Utilizing A Communication Link," issued to Norman F. Krasner on Nov. 24, 1998, which is incorporated by reference. U.S. Pat. No. 5,841,396 discloses a precision carrier frequency signal for calibrating a local oscillator of a GPS receiver which is used to acquire GPS signals. The precision carrier frequency signal is used to calibrate the local oscillator such that the output of the local oscillator, which is used to acquire GPS signals, is modified by a reference signal generated from the precision carrier frequency signal. The GPS receiver locks to this precision carrier frequency signal and generates the reference signal. In another aspect of the invention, satellite almanac data is transmitted to a remote GPS receiver unit from a base station via a communication link. The remote GPS receiver unit uses this satellite almanac data to determine approximate Doppler data for satellites in view of the remote GPS receiver unit.

Still another example implementation of the time measurement utilizing the assistance of a base station may be implemented in the system described in U.S. Pat. No. 5,999,124, entitled "Satellite Positioning System Augmentation With Wireless Communication Signals," issued to Leonid Sheynblant on Dec. 7, 1999, which is incorporated by reference. U.S. Pat. No. 5,999,124 discloses a method and apparatus for processing position information from satellite positioning system satellites and from cellular based communication signals. In one example of a method according to the invention, a SPS receiver receives SPS signals from at least one SPS satellite. This SPS receiver is coupled to and typically integrated with a communication system which receives and transmits messages in a cell based communication system. In this method, a message is transmitted in the cell based communication signals between a communication system and a first cell based transceiver. A time measurement which represents a time of travel of a message in the cell based communication signals between the cell based transceiver and the communication system is determined. Another time measurement that represents a time of travel of the SPS signals is also determined. A position of the SPS receiver is determined from a combination of at least the time measurement which represents the time of travel of a message in the cell based communication signals and from a time measurement which represents a time travel of the SPS signals. The cell based communication signals are capable of communicating data messages in a two-way direction in one embodiment between the cell based transceiver and the communication system.

Another example implementation of the time measurement utilizing the assistance of a base station may be implemented in the system described in U.S. Pat. No. 6,002,363, entitled "Combined GPS Positioning System And Communications System Utilizing Shared Circuitry," issued to Norman F. Krasner and is incorporated by reference. U.S. Pat. No. 6,002,363 discloses a combined GPS and communication system having shared circuitry. The combined system includes an antenna for receiving data representative of GPS signals, a frequency converter coupled to the antenna, a frequency synthesizer coupled to the frequency converter, an analog to digital converter coupled to the frequency converter and a processor coupled to the frequency converter. The processor processes the data representative of GPS signals to determine a pseudorange based on the data representative of GPS signals to determine a pseudorange based on the data representative of GPS signals. The integrated communication receiver includes a shared component which is at least one of the antenna, the frequency converter, the frequency synthesizer and the analog to digital converter. Typically, in certain embodiments, the processor also demodulates communication signals received as well as controls the modulation of data to be transmitted as a communication signal through a communication link.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed:

1. A method for detecting low power Global Positioning System ("GPS") signals from a plurality of received GPS signals, the method comprising:
    identifying one or more received GPS signals of the plurality of received GPS signals by a wireless device;
    delaying the plurality of received GPS signals;

canceling less than the identified one or more received GPS signals of the plurality of received GPS signals from the delayed plurality of received GPS signals to create a resultant GPS signal;

demodulating and despreading the resultant GPS signal to create a first demodulated and despread GPS signal;

detecting at least one low power GPS signal relative to one of the plurality of received GPS signals from the first demodulated and despread GPS signal transmitting the detected low power GPS signal to a stationary communication device;

comparing the transmitted low power GPS signal to a list of received GPS signals that the stationary communication device generated; and determining whether the wireless device has detected signals from a sufficient number of satellites or additional information to assist the wireless device to detect any remaining needed signals.

2. The method of claim 1 further includes calculating a geographic position for the wireless device from the detected at least one low power GPS signal and the plurality of received GPS signals.

3. The method of claim 1 wherein the step of canceling further includes:

obtaining a processed GPS signal from the plurality of received GPS signals; and combining the processed GPS signal with the delayed plurality of received GPS signals.

4. The method of claim 3, wherein the step of obtaining further includes:

demodulating the plurality of received GPS signals to create a demodulated GPS signal; and despreading the demodulated GPS signal to create a second demodulated and despread GPS signal.

5. The method of claim 4 wherein the step of combining further includes:

respreading the second demodulated and despread GPS signal to create a respread GPS signal;

remodulating the respread GPS signal to create a respread and remodulated GPS signal; and subtracting the respread and remodulated GPS signal from the delayed plurality of received GPS signals.

6. The method of claim 5 further includes calculating a geographic position from the wireless device from the result of subtracting the respread and remodulated GPS signal from the delayed plurality of received GPS signals.

7. A method for detecting at least one low power GPS signal from a plurality of received GPS signals, the method comprising:

identifying one or more received GPS signals of the plurality of received GPS signals by a wireless device;

storing the plurality of received GPS signals;

canceling less than the identified one or more received GPS signals of the plurality of received GPS signals from the stored plurality of received GPS signals to create a resultant GPS signal;

demodulating and despreading the resultant GPS signal to create a first demodulated and despread GPS signal;

detecting the at least one low power GPS signal relative to one of the plurality of received GPS signals from the first demodulated and despread GPS signal;

calculating a pseudo range for the wireless device from the detected at least one low power GPS signal transmitting the detected low power GPS signal to a stationary communication device;

comparing the transmitted low power GPS signal to a list of received GPS signals that the stationary communication device generated; and determining whether the wireless device has detected signals from a sufficient number of satellites or additional information to assist the wireless device to detect any remaining needed signals.

8. The method of claim 7 further includes calculating a geographic position for the wireless device from the detected at least one low power GPS signal and the plurality of received GPS signals.

9. The method of claim 7 wherein the step of canceling further includes:

obtaining a processed GPS signal from the plurality of received GPS signals; and combining the processed GPS signal with the stored plurality of received GPS signals.

10. The method of claim 9 wherein the step of obtaining further includes match filtering the plurality of received GPS signals to create the processed GPS signal.

11. The method of claim 10 wherein the step of combining further includes:

respreading the processed GPS signal to create a respread GPS signal;

remodulating the respread GPS signal to create a respread and remodulated GPS signal; and subtracting the respread and remodulated GPS signal from the stored plurality of received GPS signals.

12. The method of claim 11, further including calculating a geographic position for the wireless device from the result of subtracting the respread and remodulated GPS signal from the stored plurality of received GPS signals.

13. A cancellation system, for detecting low power signals from a plurality of received GPS signals, the cancellation system comprising:

a wireless device including at least one of the following:

means for identifying one or more received GPS signals of the plurality of received GPS signals;

means for delaying the plurality of received GPS signals;

means for canceling less than the identified one or more received GPS signals of the plurality of received GPS signals from the delayed plurality of received GPS signals to create a resultant GPS signal;

means for demodulating and despreading the resultant GPS signal to create a first demodulated and despread GPS signal;

means for detecting at least one low power signal relative to one of the plurality of received GPS signals from the first demodulated and despread GPS signal; and means for transmitting the detected low power signal; and a stationary communication device including at least one of the following:

means for comparing the transmitted low power signal to a list of received GPS signals that the stationary communication device generated; and means for determining whether the wireless device has detected signals from a sufficient number of satellites or additional information to assist the wireless device to detect any remaining needed signals.

14. The cancellation system of claim 13 wherein the wireless device further includes means for calculating a geographic position for the wireless device from the detected at least one low power signal and the plurality of received GPS signals.

15. The cancellation system of claim 13 wherein the canceling means further includes:
  means for obtaining a processed GPS signal from the plurality of received GPS signals; and
  means for combining the processed GPS signal with the delayed plurality of received GPS signals.

16. The cancellation system of claim 15 wherein the obtaining means further includes:
  means for demodulating a received GPS signal from the plurality of received GPS signals to create a demodulated GPS signal; and
  means for despreading the demodulated GPS signal to create a second demodulated and despread GPS signal.

17. The cancellation system of claim 16 wherein the combining means further includes:
  means for respreading the second demodulated and despread GPS signal to create a respread UPS signal;
  means for remodulating the respread GPS signal to create a respread and remodulated GPS signal; and
  means for subtracting the respread and remodulate GPS signal from the delayed plurality of received GPS signals.

18. A cancellation system for detecting low power signals from a plurality of received GPS signals, the cancellation system comprising:
  a wireless device including at least one of the following:
    means for identifying one or more received GPS signals of the plurality of received GPS signals;
    means for storing the plurality of received GPS signals;
    means for canceling less than the identified one or more received GPS signals of the plurality of received GPS signals from the stored plurality of received GPS signals to create a resultant GPS signal;
    means for demodulating and despreading the resultant GPS signal to create a first demodulated and despread GPS signal;
    means for detecting at least one low power signal relative to one of the plurality of received GPS signals from the first demodulated and despread GPS signal;
    means for calculating a pseudo range for the wireless device from the detected at least one low power GPS signal; and
    means for transmitting the detected low power signal; and
  a stationary communication device including at least one of the following:
    means for comparing the transmitted low power signal relative to a list of received GPS signals that the stationary communication device generated; and
    means for determining whether the wireless device has detected signals from a sufficient number of satellites or additional information to assist the wireless device to detect any remaining needed signals.

19. The cancellation system of claim 18 wherein the canceling means further includes:
  means for obtaining a processed GPS signal from the plurality of received GPS signals; and
  means for combining the processed signal with the stored plurality of received GPS signals.

20. The cancellation system of claim 19 wherein the obtaining means further includes means for match filtering the plurality of received GPS signals to create the processed GPS signal.

21. The cancellation system of claim 20 wherein the combining means further includes:
  means for respreading the processed GPS signal to create a respread GPS signal;
  means for remodulating the respread GPS signal to create a respread and remodulated GPS signal; and
  means for subtracting the respread and remodulated GPS signal from the stored plurality of received GPS signals.

22. The cancellation system of claim 21 wherein the wireless device further includes means for calculating a geographic position for the wireless device from the result of subtracting the respread and remodulated GPS signal from the stored plurality of received GPS signals.

23. A cancellation system for detecting low power signals from a plurality of received GPS signals, the cancellation system comprising:
  a wireless device including at least one of the following:
    a controller that identifies one or more received GPS signals of the plurality of received GPS signals;
    a delay circuit;
    a first demodulator and despreader unit that produces a first demodulated and despread GPS signal corresponding to the identified one or more received GPS signals of the plurality of received GPS signals;
    a remodulator and respreader unit in signal communication with the first demodulator and despreader unit, the remodulator and respreader unit produces a respread and remodulated GPS signal from the first demodulated and despread GPS signal;
    a combiner in signal communication with the delay circuit and the remodulator and respreader unit, the combiner produces a combined GPS signal from the output of the delay circuit and the respread and remodulated GPS signal;
    a second demodulator and second despreader unit that produces a second demodulated and despread GPS signal from the combined GPS signal, wherein the second demodulator and second despreader unit detects at least one available GPS signals based on the second demodulated and despread GPS signal; and
    a radio module that facilitates transmitting the at least one detected available GPS signals; and
  a stationary communication device that receives the at least one detected available GPS signals from the radio module of the wireless device, compares the transmitted low power GPS signal to a list of received GPS signals that the stationary communication device generated, and determines whether the wireless device has detected GPS signals from a sufficient number of satellites or additional information to assist the wireless device to detect any remaining needed GPS signals.

24. The cancellation system of claim 23 wherein the first demodulator and despreader unit further includes:
  a carrier demodulator, and
  a decoder in signal communication with the carrier demodulator.

25. The cancellation system of claim 24 further includes a data decoder in signal communication with the combiner.

26. The cancellation system of claim 25 further including a processor that utilizes the output of the data decoder to calculate a position of a satellite.

27. The cancellation system of claim 26 wherein the processor also calculates the geographic position of the cancellation system.

28. The cancellation system of claim 24 wherein the combined signal is the difference of the output of the delay circuit and the respread and modulated GPS signal.

29. A cancellation system for detecting low power GPS signals from a plurality of received signals, the cancellation system comprising:
  a wireless device including at least one of the following:
    a controller that identifies one or more received GPS signals of the plurality of received signals;
    a matched filter unit that produces a demodulated and despread signal corresponding to the identified one or more received GPS signals of the plurality of the received signals;
    a storage unit that stores the plurality of received GPS signals;
    a remodulator and respreader unit in signal communication with the matched filter unit, the remodulator and respreader unit produces a respread and remodulated GPS signal from the output of the matched filter;
    a combiner in signal communication with the storage unit and the remodulator and respreader unit, the combiner produces a combined GPS signal from the output of the storage unit and the remodulated and respread GPS signal;
    a demodulator and second despreader unit that produces a first demodulated and despread GPS signal from the received combined GPS signal, wherein the demodulator and second despreader unit detects at least one available GPS signals based on the first demodulated and despread GPS signal; and
    a radio module that facilitates transmitting the at least one detected available GPS signals; and
  a stationary communication device that receives the at least one detected available GPS signals from the radio module of the wireless device, compares the transmitted low power GPS signal to a list of received GPS signals that the stationary communication device generated, and determines whether the wireless device has detected GPS signals from a sufficient number of satellites or additional information to assist the wireless device to detect any remaining needed GPS signals.

30. The cancellation system of claim 29 further including a switch in signal communication with the combiner, data decoder, storage unit, and processor.

31. The cancellation system of claim 29 wherein the processor also calculates the geographic position of the cancellation system.

32. The cancellation system of claim 29 wherein the combined GPS signal is the difference of the output of the storage unit and the respread and remodulated GPS signal.

33. A non-transitory computer readable medium having software for detecting low power signals from a plurality of received signals for a cancellation system, the non-transitory computer readable medium being located at a wireless device, the software comprising:
  logic configured to identify one or more received signals of the plurality of received signals;
  logic configured to delay the plurality of received signals;
  logic configured to cancel less than the identified one or more received signals of the plurality of received signals from the delayed plurality of received signals to create a resultant signal;
  logic configured to demodulate and despread the resultant signal to create a first demodulated and despread signal;
  logic configured to detect at least one power signal from the first demodulated and despread signal; and
  logic for transmitting the at least one detected low power signal to a stationary communication device, wherein the stationary communication device compares the at least one transmitted low power signal to a list of received GPS signals that the stationary communication device generated, and determines whether the wireless device has detected GPS signals from a sufficient number of satellites or additional information to assist the wireless device to detect any remaining needed GPS signals.

34. The non-transitory computer readable medium of claim 33 further including logic for calculating a geographic position for the wireless device from the detected at least one low power signal and the plurality of received signals.

35. The non-transitory computer readable medium of claim 33 wherein, the canceling logic further includes:
  logic configured to obtain a processed signal from the plurality of received signals; and
  logic configured to combine the processed signal with the delayed plurality of received signals.

36. The non-transitory computer readable medium 35 wherein the combining logic further includes:
  logic configured to demodulate the plurality of received signals to create a demodulated signal; and
  logic configured to despread the demodulated signal to create a second demodulated and despread signal.

37. The non-transitory computer readable medium of claim 36 wherein the combining logic further includes:
  logic configured to respread the second demodulated and despread signal to create a respread signal;
  logic configured to remodulate the respread signal to create a respread and remodulated signal; and
  logic configured to subtract the respread and remodulated signal from the delayed plurality of received signals.

38. A non-transitory computer readable medium having software for detecting low power signals from a plurality of received signals for a cancellation system, the software comprising:
  logic configured to identify one or more received signals of the plurality of received signals;
  logic configured to store the plurality of received signals;
  logic configured to cancel less than the identified one or more received signals of the plurality of received signals from the stored plurality of received signals to create a resultant signal;
  logic configured to demodulate and despread the resultant signal to create a first demodulated and despread signal;
  logic configured to detect at least one lower power signal from the first demodulated and despread signal;
  logic for calculating a pseudo range for a wireless device from the detected at least one low power signal; and
  logic for transmitting the detected low power signal to a stationary communication device, wherein the stationary communication device compares the transmitted low power signal to a list of received GPS signals that the stationary communication device generated, and determines whether the wireless device has detected GPS signals from a sufficient number of satellites or additional information to assist the wireless device to detect any remaining needed GPS signals.

39. The non-transitory computer readable medium of claim 38 further including logic for calculating a geographic position for the wireless device from the detected at least one low power signal and the plurality of received signals.

40. The non-transitory computer readable medium of claim 38 wherein the canceling logic further includes:
  logic configured to obtain a processed signal from the plurality of received signals; and
  logic configured to combine the processed signal with the stored plurality of received signals.

41. The non-transitory computer readable medium of claim 40 wherein the obtaining logic further includes logic configured to match filter the received signal from the plurality of received signals to create a processed signal.

42. The non-transitory computer readable medium of claim 41 wherein the combining logic further includes:

logic configured to respread the processed signal to create a respread signal;

logic configured to remodulate the respread signal so as to create a respread and remodulated signal; and logic configured to subtract the respread and remodulated signal from the stored plurality of received signals.

* * * * *